United States Patent
Raghunath et al.

(10) Patent No.: US 10,230,809 B2
(45) Date of Patent: Mar. 12, 2019

(54) MANAGING REPLICA CACHING IN A DISTRIBUTED STORAGE SYSTEM

(71) Applicant: Intel Corporation, Santa Clara, CA (US)

(72) Inventors: Arun Raghunath, Hillsboro, OR (US); Michael Mesnier, Scappoose, OR (US); Yi Zou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 15/056,622

(22) Filed: Feb. 29, 2016

(65) Prior Publication Data

US 2017/0251073 A1 Aug. 31, 2017

(51) Int. Cl.
*G06F 15/167* (2006.01)
*H04L 29/08* (2006.01)
(Continued)

(52) U.S. Cl.
CPC .......... *H04L 67/2842* (2013.01); *G06F 3/061* (2013.01); *G06F 3/065* (2013.01); *G06F 3/067* (2013.01); *G06F 3/0619* (2013.01); *G06F 3/0659* (2013.01); *G06F 12/0813* (2013.01); *G06F 12/0868* (2013.01);
(Continued)

(58) Field of Classification Search
CPC .. G06F 2212/1032; G06F 3/065; G06F 3/067; H04L 49/901; H04L 67/1097; H04L 67/2842
See application file for complete search history.

(56) References Cited

U.S. PATENT DOCUMENTS 8,615,678 B1 * 12/2013 Madnani ............. G06F 11/1666
714/47.1
8,726,044 B2 * 5/2014 Hameed ............... G06F 12/0868
713/193
(Continued)

FOREIGN PATENT DOCUMENTS

WO 2013/101037 A1 7/2013

OTHER PUBLICATIONS

International search report for PCT application No. PCT/US2017/015243, dated Apr. 28, 2017 (3 pages).
(Continued)

*Primary Examiner* — Mohamed A Wasel
(74) *Attorney, Agent, or Firm* — Barnes & Thornburg LLP

(57) ABSTRACT

Technologies for managing replica caching in a distributed storage system include a storage manager device. The storage manager device is configured to receive a data write request to store replicas of data. Additionally, the storage manager device is configured to designate one of the replicas as a primary replica, select a first storage node to store the primary replica of the data in a cache storage and at least a second storage node to store a non-primary replica of the data in a non-cache storage. The storage manager device is further configured to include a hint in a first replication request to the first storage node that the data is to be stored in the cache storage of the first storage node as the primary replica. Further, the storage manager device is configured to transmit replication requests to the respective storage nodes. Other embodiments are described and claimed.

30 Claims, 9 Drawing Sheets

(51) Int. Cl.
*G06F 3/06* (2006.01)
*G06F 12/0813* (2016.01)
*H04L 12/879* (2013.01)
*G06F 12/0868* (2016.01)
*G06F 12/0888* (2016.01)

(52) U.S. Cl.
CPC ........ G06F 12/0888 (2013.01); H04L 49/901 (2013.01); H04L 67/02 (2013.01); H04L 67/1097 (2013.01); *G06F 2212/1016* (2013.01); *G06F 2212/1032* (2013.01); *G06F 2212/154* (2013.01); *G06F 2212/222* (2013.01); *G06F 2212/285* (2013.01); *G06F 2212/60* (2013.01); *G06F 2212/62* (2013.01)

(56) References Cited

U.S. PATENT DOCUMENTS

| | | | |
|---|---|---|---|
| 9,170,895 B2* | 10/2015 | Lim | G06F 11/2025 |
| 2009/0006593 A1 | 1/2009 | Cortes | |
| 2010/0131468 A1* | 5/2010 | Thakore | G06F 17/30371 |
| | | | 707/624 |
| 2011/0016152 A1* | 1/2011 | Popovski | G06F 3/0608 |
| | | | 707/797 |
| 2011/0320532 A1* | 12/2011 | Cheng | G06F 17/30194 |
| | | | 709/203 |
| 2013/0232310 A1 | 9/2013 | Kruus | |
| 2014/0149537 A1 | 5/2014 | Shankaran et al. | |
| 2015/0106549 A1* | 4/2015 | Brown | G06F 3/065 |
| | | | 711/103 |
| 2015/0269239 A1 | 9/2015 | Swift et al. | |
| 2015/0277969 A1 | 10/2015 | Strauss et al. | |
| 2016/0269501 A1* | 9/2016 | Usgaonkar | H04L 67/2842 |
| 2016/0274806 A1* | 9/2016 | Barnes | G06F 12/0813 |
| 2017/0242822 A1* | 8/2017 | Malladi | G06F 1/30 |

OTHER PUBLICATIONS

Written opinion for PCT application No. PCT/US2017/015243, dated Apr. 28, 2017 (4 pages).

* cited by examiner

MANAGING REPLICA CACHING IN A DISTRIBUTED STORAGE SYSTEM

BACKGROUND

Typical distributed storage systems include a storage manager device, which is sometimes referred to as a proxy, coupled to multiple storage nodes. The storage manager device is configured to receive data uploaded from a client device and transmit the data to several of the storage nodes for storage therein, as copies ("replicas"). Similarly, when a client device requests the data, the storage manager device requests the data from one of the storage nodes that stored a replica of the data, based on load balancing policies or other rules. The storage manager device then receives the data and transmits the data to the client device. In some distributed storage systems, the storage nodes include hard disk drives (HDDs) and solid state drives (SSDs), which provide faster read and write times than HDDs. In such systems, a determination to store data in the SSD rather than the HDD is applied across all of the storage nodes that are to store the data, such that the each of the storage nodes stores the data in their respective SSD rather than their HDD.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
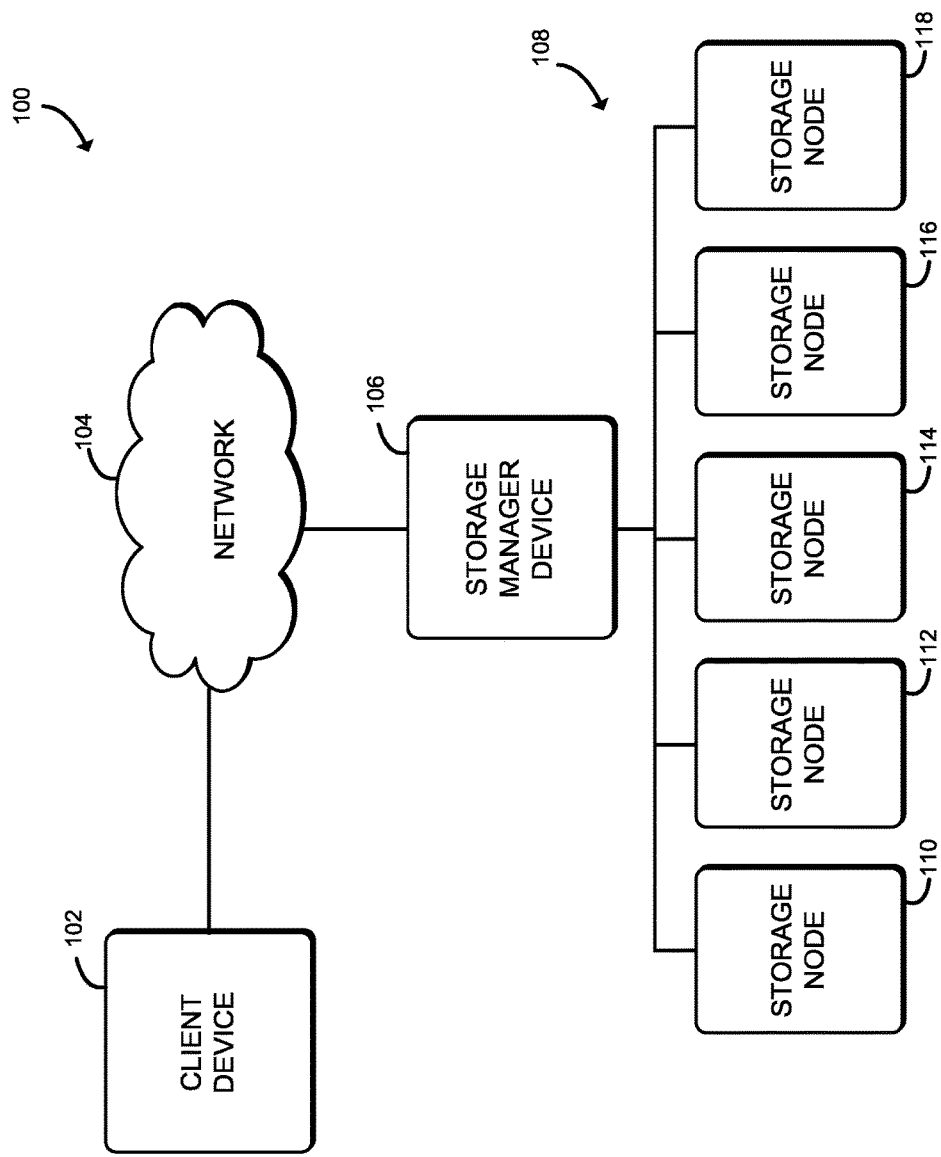
FIG. 1 is a simplified block diagram of at least one embodiment of a distributed storage system to manage cached and non-cached replicas of data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a distributed storage system 100 for managing cached and non-cached replicas of data includes a client device 102 and a storage manager device 106 in communication over a network 104. Additionally, the storage manager device 106 is in communication with storage nodes 110, 112, 114, 116, and 118 via a storage network 108. While five storage nodes are shown connected to the storage network 108, it should be understood that in other embodiments, a fewer or greater number of storage nodes may be connected to the storage network 108. In use, the storage manager device 106 is configured to respond to requests from the client device 102 to write data to or to read data from the array of storage nodes. The requests from the client device include an identifier, such as a uniform resource locator (URL), of the data to be read or written. When the request is a write request, the storage manager device 106 is configured to determine, based on the identifier, one of the storage nodes connected to the storage network 108 to store a primary replica of the data and at least one other storage node to store a non-primary replica of the data. The primary replica of the data is stored in an SSD of the corresponding storage node while the non-primary replica of the data is stored in an HDD of the corresponding storage node. Similarly, when the request is a read request, the storage manager device 106 is configured to determine which of the storage nodes has the primary replica, which is stored in the corresponding SSD, and request the data from that storage node, rather than from one of the other storage nodes that stored a non-primary replica of the data in an HDD. As described in more detail herein, in some embodiments, the storage node that is to store the primary replica (the "primary storage node") is configured to perform a portion of the functionality of the storage manager device 106. For example, in such embodiments, the primary storage node may contact the storage nodes that are to store the non-primary replicas (the "secondary storage nodes") to request that they do so. Regardless, by causing only one of the storage nodes connected to the storage network 108 to store a replica of the data in an SSD, the SSDs of the other storage nodes have additional capacity to store other data that would have otherwise been used to store redundant copies of the data.

Figure 2:
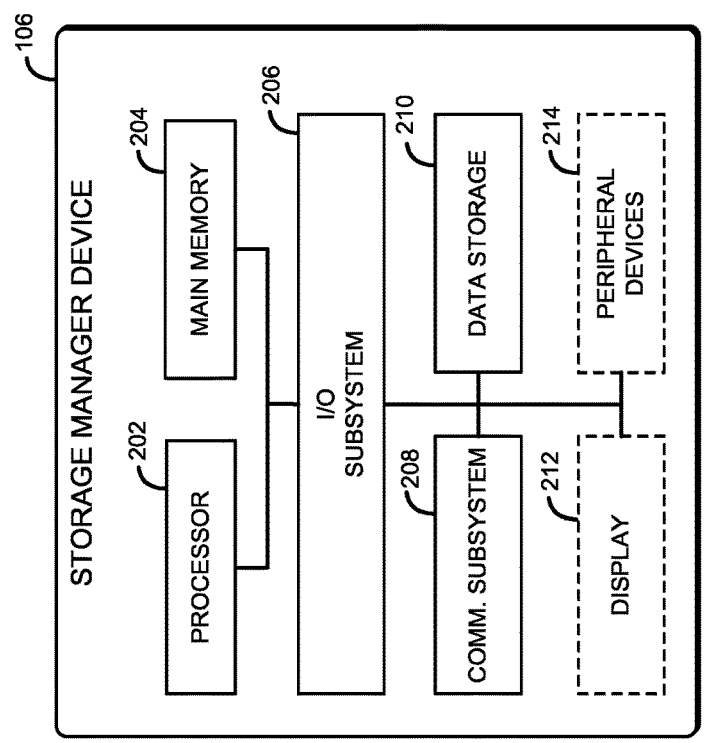
FIG. 2 is a simplified block diagram of at least one embodiment of a storage manager device included in the system of FIG. 1.

Referring now to FIG. 2, the storage manager device 106 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Although shown as a single computing device, it should be appreciated that the storage manager device 106 may be embodied as a collection of servers and/or other compute devices configured to cooperate to perform the functions described herein.

The illustrative storage manager device 106 includes a processor 202, a main memory 204, an I/O subsystem 206, a communication subsystem 208, a data storage device 210, a display 212, and peripheral devices 214. Of course, the storage manager device 106 may include other or additional components, such as those commonly found in a compute device (e.g., various input/output devices), in other embodiments. Additionally, in some embodiments, one or more of the illustrative components may be incorporated in, or otherwise form a portion of, another component. For example, the memory 204 may be incorporated in the processor 202 in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the storage manager device 106 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the storage manager device 106. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the storage manager device 106, on a single integrated circuit chip.

The communication subsystem 208 may be embodied as any communication circuit, device, or collection thereof, capable of enabling communications between the storage manager device 106 and other remote devices over a computer network (e.g., the network 104). The communication subsystem 208 may be configured to use any one or more communication technology (e.g., wired or wireless communications) and associated protocols (e.g., Ethernet, Bluetooth®, Wi-Fi®, WiMAX, etc.) to effect such communication.

The data storage device 210 may be embodied as any type of device or devices configured for short-term or long-term storage of data such as, for example, memory devices and circuits, memory cards, hard disk drives, solid-state drives, or other data storage devices. The data storage device 210 may store, for example, one or more lookup tables for use in determining which storage node is to store a primary replica of data and which storage nodes are to store non-primary replicas of the data.

The display 212 may be embodied as any type of display capable of displaying digital information such as a liquid crystal display (LCD), a light emitting diode (LED), a plasma display, a cathode ray tube (CRT), or other type of display device. Additionally, the peripheral devices 214 may include any number of additional input/output devices, interface devices, and/or other peripheral devices.

Referring back to FIG. 1, the client device 102 may be embodied as any type of computing device capable of sending requests to write data or to read data. While one client device 102 is shown in FIG. 1, it should be understood that in other embodiments, any number of client devices similar to the client device 102 may be in communication with the storage manager device 106 via the network 104. The client device 102 may include components commonly found in a client device, such as a processor, memory, I/O subsystem, data storage communication subsystem, etc. Those components may be substantially similar to the corresponding components of the storage manager device 106. As such, further descriptions of the like components are not repeated herein with the understanding that the description of the corresponding components provided above in regard to the storage manager device 106 applies equally to the corresponding components of the client device 102.

Figure 3:
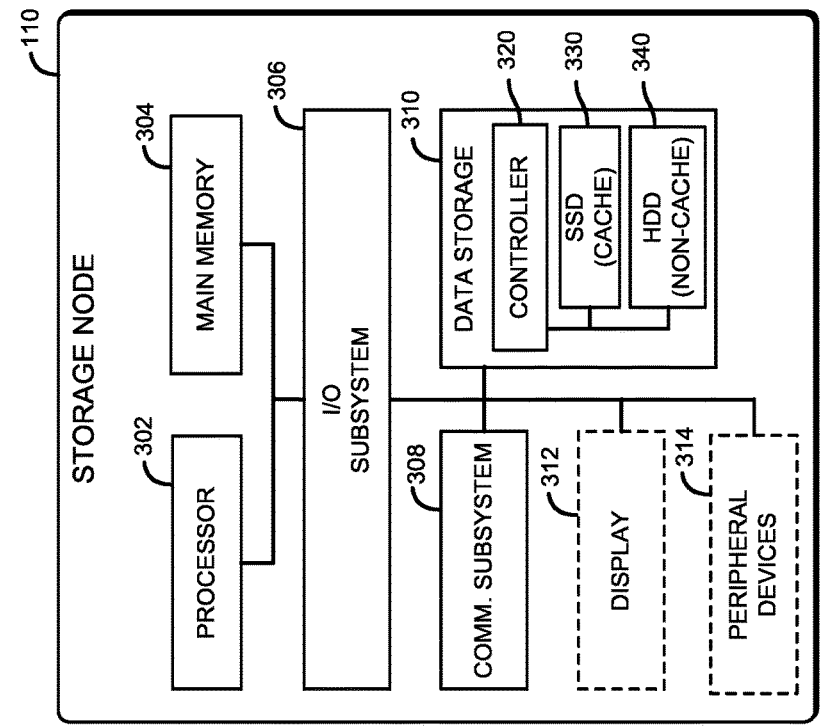
FIG. 3 is a simplified block diagram of at least one embodiment of a storage node included in the system of FIG. 1.

Referring now to FIG. 3, the storage node 110 may be embodied as any computing device capable of selectively storing a replica of data in one of a cache storage device or a non-cache storage device, and retrieving the data from the corresponding storage device in response to requests from the storage manager device 106. In the illustrative embodiment, each storage node (e.g., storage nodes 110, 112, 114, 116, 118) includes a processor 302, a memory 304, an I/O subsystem 306, a communication subsystem 308, a display 312, and peripheral devices 314. Those components may be substantially similar to the corresponding components of the storage manager device 106. As such further descriptions of the like components are not repeated herein with the understanding that the description of the corresponding components provided above in regard to the storage manager device 106 applies equally to the corresponding components of the storage node 110.

The storage node 110 also includes a data storage device 310 that may include components that are not necessarily in the data storage device 210 of the storage manager device 106. In the illustrative embodiment, the data storage device 310 includes a controller 320 that selects whether to store and retrieve data from a cache storage device 330, such as an SSD, or a non-cache storage device 340, such as an HDD. As such, the cache storage device 330 is embodied as a storage device that is capable of reading and writing data faster than the non-cache storage device 340. As a trade-off, in at least some embodiments, the cache storage device 330 has less storage capacity than the non-cache storage device 340. As described in more detail herein, when the storage node 110 receives a request to replicate data, the request includes a "hint" (i.e., an indicator) usable by the storage node 110 to determine which of the cache storage device 330 and the non-cache storage device 340 to store the data in. Similarly, when the storage node 110 receives a request to retrieve data, the request also includes hint usable by the storage node 110 to determine which of the cache storage device 330 and the non-cache storage device 340 the data is stored in. In some embodiments, the storage node 110 is configured to interpret the lack of an indicator in the request as a hint that the data is associated with a non-primary replica and should be written to or read from the non-cache storage device 340, rather than the cache storage device 330. The storage nodes 112, 114, 116, and 118, as well as other storage nodes of the system 100, include components similar to those described above with reference to the storage node 110. Accordingly, the above description of the components of the storage node 110 applies equally to the storage nodes 112, 114, 116, and 118.

Referring back to FIG. 1, as discussed above, the client device 102 is configured to communicate with the storage manager device 106 over the network 104. The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Further, as described above, the storage manager device 106 is in communication with the storage nodes via the storage network 108. The above description of the network 104 applies equally to the storage network 108. In some embodiments, the storage nodes are remote from the storage manager device 106 while in other embodiments, the storage nodes are local to the storage manager device 106. Accordingly, depending on the particular embodiment, the storage network 108 may include a LAN, a WAN, a global network, or any combination thereof.

Figure 4:
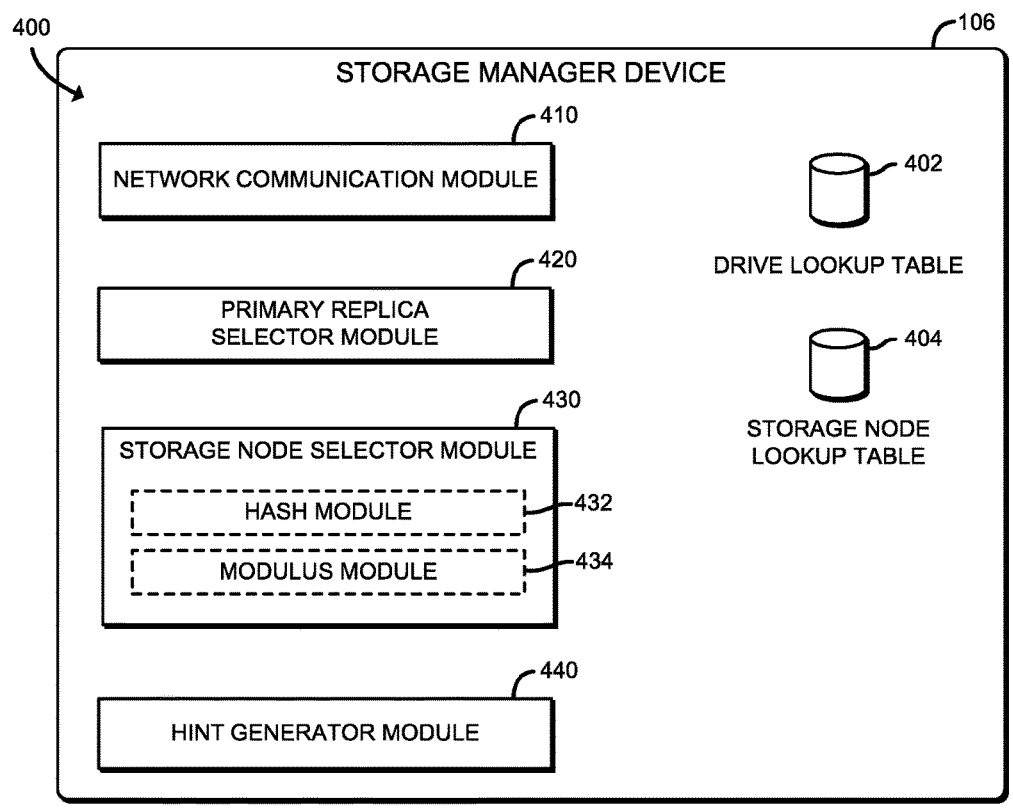
FIG. 4 is a simplified block diagram of an environment that may be established by the storage manager device of FIG. 2.

Referring now to FIG. 4, in an embodiment, the storage manager device 106 establishes an environment 400 during operation. The illustrative environment 400 includes a network communication module 410, a primary replica selector module 420, a storage node selector module 430, and a hint generator module 440. Each of the modules, logic, and other components of the environment 400 may be embodied as hardware, firmware, software, or a combination thereof. As such, in some embodiments, one or more of the modules of the environment 400 may be embodied as circuitry or collection of electrical devices (e.g., network communication circuitry 410, primary replica selector circuitry 420, storage node selector circuitry 430, hint generator circuitry 440, etc.). It should be appreciated that, in such embodiments, one or more of the network communication circuitry 410, the primary replica selector circuitry 420, the storage node selector circuitry 430, and the hint generator circuitry 440 may form a portion of one or more of the processor 202, the memory 204, the I/O subsystem 206, and/or other components of the storage manager device 106. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor 202 or other components of the storage manager device 106. In the illustrative environment 400, the storage manager device 106 includes a drive lookup table 402 and a storage node lookup table 404, each of which may be accessed by the various modules and/or sub-modules of the storage manager device 106. It should be appreciated that the storage manager device 106 may include other components, sub-components, modules, sub-modules, and/or devices commonly found in a server computing device, which are not illustrated in FIG. 4 for clarity of the description.

The network communication module 410, which may be embodied as hardware, firmware, software, virtualized hardware, emulated architecture, and/or a combination thereof as discussed above, is configured to manage inbound and outbound network communications to and from the storage manager device 106, respectively. For example, the network communication module 410 is configured to receive requests from the client device 102 to write or read data, transmit corresponding requests to the storage nodes connected to the storage network 108, receive responses from the storage nodes, and transmit corresponding responses to the client device 102. In some embodiments, at least a portion of the functionality of the network communication module 410 may be performed by the communication subsystem 208 of FIG. 2.

The primary replica selector module 420, which may be embodied as hardware, firmware, software, virtualized hardware, emulated architecture, and/or a combination thereof as discussed above, is configured to designate a replica as a primary replica. The designation of the primary replica may be a replica index number, such as one. For example, if the storage network 108 is to store three replicas of a set of data transmitted from the client device 102, the primary replica selector module 420 may be configured to designate the first replica of the group of three replicas as the primary replica. Accordingly, the other two replicas are designated as non-primary replicas. The primary replica selector module 420 may be configured to designate the primary replica based on a predefined rule, such as a configuration setting in an initialization file, a hardcoded setting, or other type of predefined rule. In other embodiments, the primary replica selector module 420 may designate the primary replica based on one or more characteristics of the data or of the storage network 108. Regardless, as described in more detail herein, when transmitting a request to replicate the data, the storage manager device 106 includes a hint with the request associated with the primary replica to indicate that the primary replica is to be written to the cache storage device 330.

The storage node selector module 430, which may be embodied as hardware, firmware, software, virtualized hardware, emulated architecture, and/or a combination thereof as discussed above, is configured to select a one of the storage nodes, such as the storage node 110, to store the primary replica of data uploaded to the storage manager device 106 from the client device 102 in conjunction with a data write request. As described above, the primary replica is to be stored in the cache storage 330. The storage node selector module 430 is also configured to select at least one other storage node, such as the storage nodes 112, 114, to store non-primary replicas of the data in their respective non-cache storage devices 340. To do so, the illustrative storage node selector module 430 includes a hash module 432 and a modulus module 434. The hash module 432 is configured to generate a hash of an identifier that is included in a data write request or a data read request from the client device 102. The identifier identifies the data to be written or read. Further, in some embodiments, the identifier may be embodied as a uniform resource locator (URL). In some embodiments, the generated hash indicates a partition index in which to store the replicas. In other embodiments, the modulus module 434 is configured to perform a modulus operation on the generated hash. In such embodiments, the result of the modulus operation is the partition number. In at least some embodiments, the modulus module 434 is configured to perform the modulus operation using the hash as the dividend and the total number of partitions in the storage nodes of the storage network 108 as the divisor. In other embodiments, the modulus module 434 is configured to use another value as the divisor, such as a weighting value that the modulus module 434 may be configured to vary over time and/or based on a load balancing function.

Regardless, the storage node selector module 430 is configured to select the storage nodes to store the primary and non-primary replicas in, based on the partition number generated by the processes described above. In some embodiments, the storage node selector module 430 is configured to read the drive lookup table 402 to determine which drives in the storage nodes the replicas are to be stored in. The drive lookup table 402 associates each drive identifier (e.g., drive number) with a partition index and a replica index. For example, if the partition index is two, then the drive lookup table 402 specifies a drive number associated with the first replica and the second partition, another drive number associated with the second replica and the second partition, and so on. The storage node selector module 430 may be configured to determine the drive number for each of N replicas that the storage manager device 106 is configured to manage. Further, the storage node selector module 430 may be configured to determine the corresponding storage nodes based on the storage node lookup table 404. The storage node lookup table 404 associates drive identifiers with storage node identifiers. For example, if the storage manager device 106 is configured to manage three replicas of the data, the storage node selector module 430 is configured to determine the identifiers of storage nodes identified in the storage node lookup table 404 based on the identifiers of three drives from the drive lookup table 402. The storage node selector module 430 is also configured to perform the processes described above in response to a data read request from the client device 102, to identify the storage nodes that contain the primary and non-primary replicas of the data.

It should be appreciated that each of the hash module 432 and the modulus module 434 of the storage node selector module 430 may be separately embodied as hardware, firmware, software, virtualized hardware, emulated architecture, and/or a combination thereof. For example, the hash module 432 may be embodied as a hardware component, while the modulus module 434 is embodied as a virtualized hardware component or as some other combination of hardware, firmware, software, virtualized hardware, emulated architecture, and/or a combination thereof.

The hint generator module 440, which may be embodied as hardware, firmware, software, virtualized hardware, emulated architecture, and/or a combination thereof as discussed above, is configured to include a hint (i.e., an indicator) in a replication request or a data retrieval request to a storage node that is to store a primary replica or retrieve data from a primary replica. The hint is usable by the receiving storage node to identify that the storage node is to use the cache storage device 330, rather than the non-cache storage device 340 to read or write the data associated with the primary replica.

Figure 5:
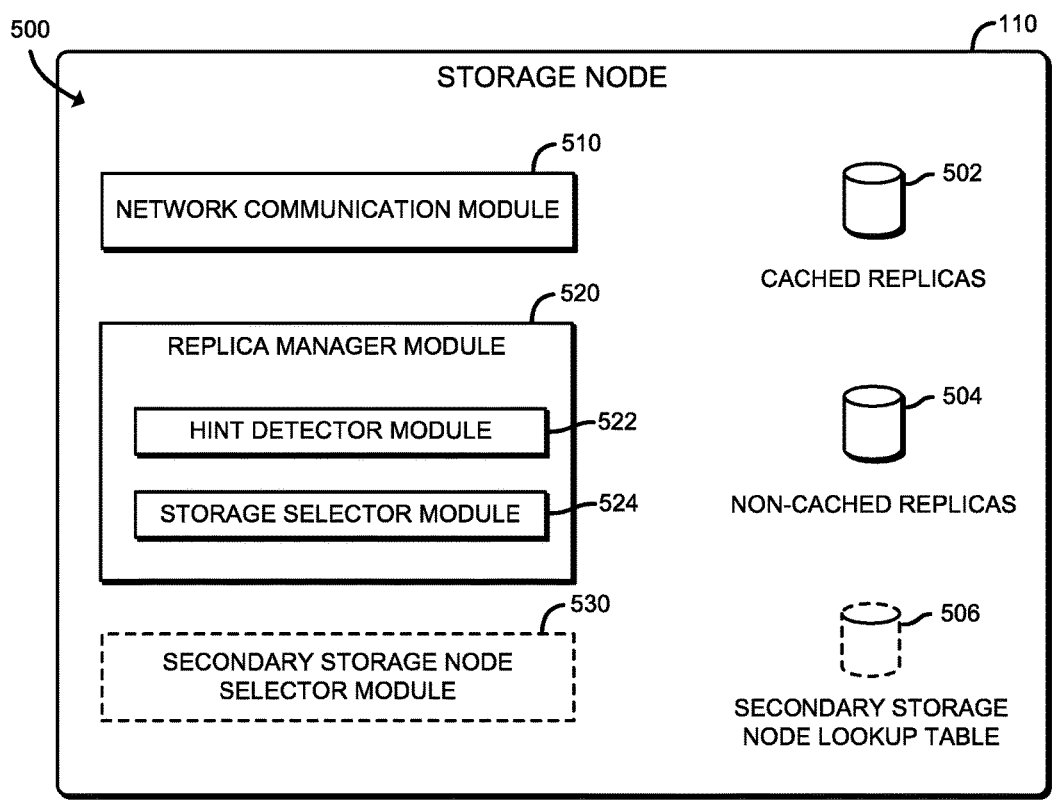
FIG. 5 is a simplified block diagram of an embodiment of an environment that may be established by the storage node of FIG. 3.

Referring now to FIG. 5, in an embodiment, the storage node 110 establishes an environment 500 during operation. While the environment 500 is described in relation to the storage node 110, it should be understood that the other storage nodes in the system 100 (e.g., the storage nodes 112, 114, 116, and 118) may also establish the environment 500. The illustrative environment 500 includes a network communication module 510, a replica manager module 520, and a secondary storage node selector module 530. Each of the modules, logic, and other components of the environment 500 may be embodied as hardware, firmware, software, or a combination thereof. As such, in some embodiments, one or more of the modules of the environment 500 may be embodied as circuitry or collection of electrical devices (e.g., network communication circuitry 510, replica manager circuitry 520, secondary storage node selector circuitry 530, etc.). It should be appreciated that, in such embodiments, one or more of the network communication circuitry 510, the replica manager circuitry 520, and the secondary storage node selector circuitry 530 may form a portion of one or more of the processor 302, the memory 304, the I/O subsystem 306, and/or other components of the storage node 110. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the processor 302 or other components of the storage node 110. In the illustrative environment 500, the storage node 110 includes cached replicas 502, non-cached replicas 504, and a secondary storage node lookup table 506, each of which may be accessed by the various modules and/or sub-modules of the storage node 110. It should be appreciated that the storage node 110 may include other components, sub-components, modules, sub-modules, and/or devices commonly found in a computing device, which are not illustrated in FIG. 5 for clarity of the description.

The network communication module 510, which may be embodied as hardware, firmware, software, virtualized hardware, emulated architecture, and/or a combination thereof as discussed above, is configured to manage inbound and outbound network communications to and from the storage node 110, respectively. For example, the network communication module 510 is configured to receive requests from the storage manager device 106 to store data as a replica or to retrieve data from a stored replica, and to transmit corresponding responses to the storage manager device 106.

In some embodiments, at least a portion of the functionality of the network communication module 510 may be performed by the communication subsystem 308 of FIG. 3.

The replica manager module 520, which may be embodied as hardware, firmware, software, virtualized hardware, emulated architecture, and/or a combination thereof as discussed above, is configured to manage the writing of data into the cache storage device 330 as a primary replica (e.g., the cached replicas 502), the writing of other data into the non-cache storage device 340 as a non-primary replica (e.g., the non-cached replicas 504), the reading of data from primary replicas, and the reading of data from non-primary replicas, in accordance with requests from the storage manager device 106. In order to do so, the illustrative replica manager module 520 includes a hint detector module 522 and a storage selector module 524. The hint detector module 522 may be configured to analyze a replication request or a data retrieval request from the storage manager device 106 and detect a hint (i.e., an indicator) in the request. The hint indicates that the request pertains to a primary replica, rather than a non-primary replica. The storage selector module 524 may be configured to select the cache storage device 330 or the non-cache storage device 340 for use in writing or reading data as a function of whether the hint detector module 522 detected a hint in the request. For example, if the hint detector module 522 detects a hint in a replication request, then the storage selector module 524 may be configured to select the cache storage device 330 for use in writing data associated with the replication request. Accordingly, in the example, the stored data would be one of the cached replicas 502. By contrast, if the hint detector module 522 does not detect a hint in a replication request, then the storage selector module 524 may be configured to select the non-cache storage device 340 for use in writing data associated with the replication request. Accordingly, the stored data would be one of the non-cached replicas 504. Further, if the hint detector module 522 detects a hint in a data retrieval request from the storage manager device 106, then the storage selector module 524 may be configured to read the requested data from the cache storage device 330 (i.e., from one of the cached replicas 502). If, on the other hand, the hint detector module 522 does not detect a hint in a data retrieval request from the storage manager device 106, then the storage selector module 524 may be configured to read the requested data from the non-cache storage device 340 (i.e., from one of the non-cached replicas 504).

The replica manager module 520, which may be embodied as hardware, firmware, software, virtualized hardware, emulated architecture, and/or a combination thereof as discussed above, is configured to select one or more additional storage nodes to which to send a replication request or a data retrieval request. For example, in some embodiments, the storage manager device 106 is configured to send a request (e.g., a replication request) to the storage node (a "primary storage node") that is associated with a primary replica of data, and to rely on the primary storage node to transmit requests to one or more other storage nodes to store non-primary replicas of the data. More specifically, while in some embodiments, the storage manager device 106 is responsible for transmitting requests to each of the storage nodes that are to store a primary or non-primary replica of data, and include hints in the requests to indicate that the data is associated with a primary replica or not, in other embodiments, the storage manager device 106 is configured to only contact the primary node to store the primary replica, and the primary node is configured to identify and contact the secondary nodes to store the non-primary replicas of the data. In the latter embodiments, the primary storage node is configured to use the secondary storage node selector module 530, which may be configured to access the secondary storage node lookup table 506 to determine which secondary storage nodes to send the requests to. For example, the secondary storage node lookup table 506 may designate a set of secondary storage nodes based on the identity of the primary storage node. As described above, in other embodiments, the storage manager device 106 is configured to transmit requests to each of the storage nodes associated with the primary replica and the non-primary replicas of data, rather than relying on the primary storage node to transmit requests to secondary storage nodes. In such embodiments, the secondary storage node selector module 530 may not be included in the environment 500.

Figure 6:
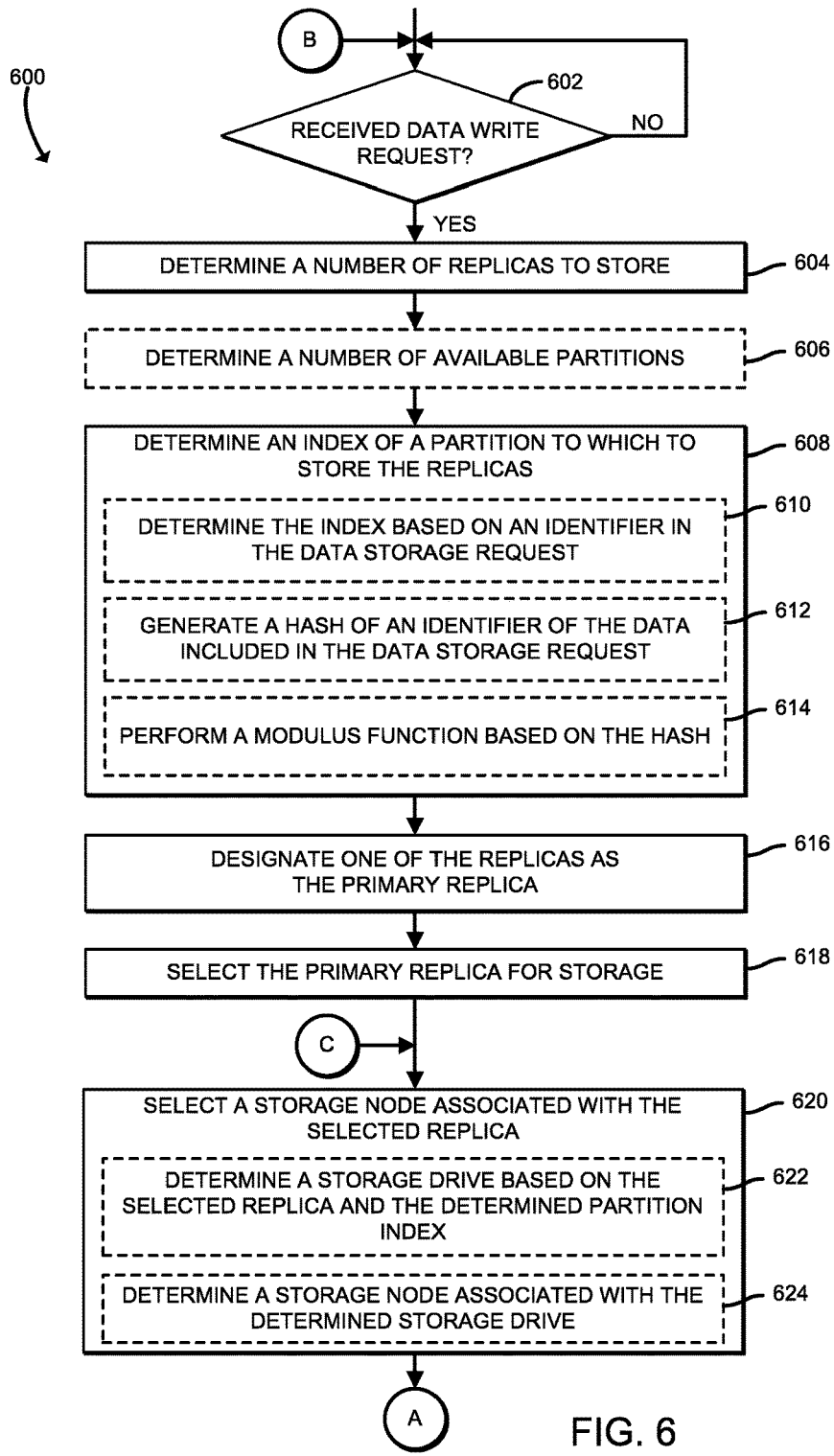
FIGS. 6-7 are a simplified flow diagram of at least one embodiment of a method for writing data that may be performed by the data storage manager of FIG. 2.
Figure 7:
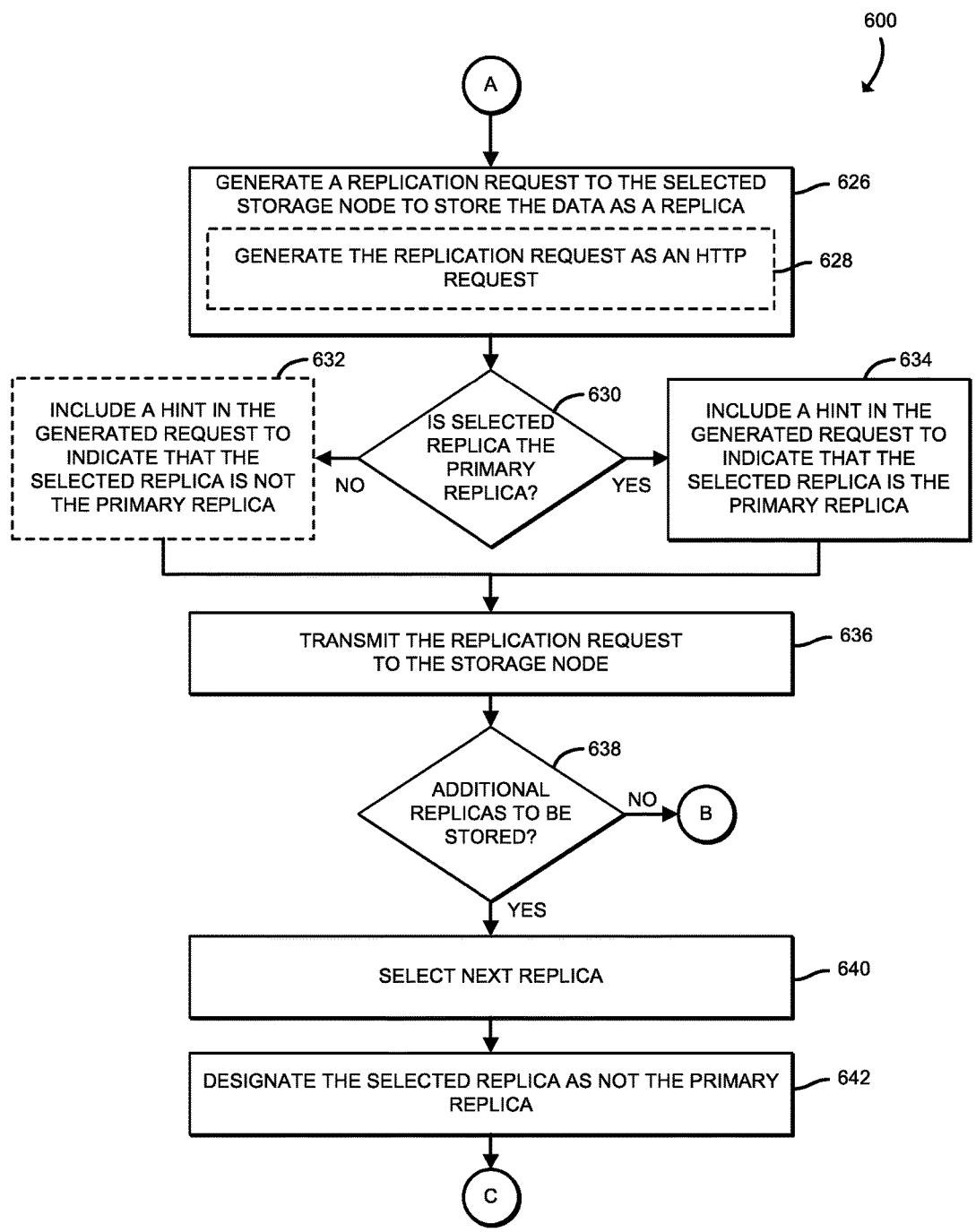

Referring now to FIGS. 6 and 7, in use, the storage manager device 106 may execute a method 600 for writing data in response to a request from the client device 102. The method 600 begins with block 602, in which the storage manager device 106 monitors for a data write request. Once the storage manager device 106 has received a data write request, the method 600 advances to block 604, in which the storage manager device 106 determines a number of replicas of the data to store. The storage manager device 106 may determine the number of replicas to store by reading a predefined configuration setting, by identifying an indicator in the data write request that defines a priority of the data and determining the number of replicas as a function of the priority, or by another other method. Regardless, in block 606, the storage manager device 106 determines a number of available partitions among the storage nodes connected to the storage network 108. The storage manager device 106 may determine the number of partitions by reading a predefined configuration setting, by querying the storage nodes of the storage network 108 for their respective partition numbers and totaling the results, or by another method.

In block 608, the storage manager device 106 determines an index of a partition to which to store the replicas. Depending on the particular embodiment, the storage manager device 106 may determine the index of the partition in a number of ways. For example, as indicated in block 610, the storage manager device 106 may determine the index based on an identifier in the data write request. As an example, the storage manager device 106 may detect an identifier, such as a name, of the data or an identifier of a location of where the data is to be accessible once it is written, and generate the index as a function of the identifier. As indicated in block 612, in some embodiments, the storage manager device 106 may generate a hash of an identifier of the data included in the data write request. The resulting hash may be indicative of the partition index. Further, as indicated in block 614, in some embodiments, the storage manager device 106 may perform a modulus function based on the hash generated in block 612. The result of modulus function may be the index of the partition to which to store the replicas. In some embodiments, in performing the modulus function, the storage manager device 106 may set the hash as the dividend and the total number of partitions from block 606 as the divisor. In other embodiments, rather than using the total number of partitions as the divisor, the storage manager device 106 uses a weighting value that may vary over time and/or based on a load balancing function.

In block 616, the storage manager device 106 designates one of the replicas as the primary replica. For example, the storage manager device 106 may read a predefined configuration setting that specifies an index (e.g., the first replica) as always being the primary replica. In block 618, the storage manager device 106 selects the primary replica for storage of the data. In block 620, the storage manager device 106 selects a storage node associated with the selected replica. In some embodiments, the storage manager device 106 may determine a storage drive based on the selected replica and the determined partition index, as indicated in block 622. For example, the storage manager device 106 may access the drive lookup table 402 of FIG. 4 to determine the storage drive associated with the selected replica index and the partition index. In some embodiments, the storage manager device 106 may then determine a storage node associated with the determined storage drive, as indicated in block 624. For example, after determining the storage drive, the storage manager device 106 may access the storage node lookup table 404 of FIG. 4 to determine the identity of the storage node associated with the determined storage drive.

In block 626 of FIG. 7, the storage manager device 106 may generate a replication request to the selected storage node to store the data as a replica. In some embodiments, as indicated in block 628, the storage manager device 106 may generate the replication request as an hypertext transfer protocol (HTTP) request. As an example, the request may associated with an HTTP verb, such as an HTTP PUT request. In some embodiments, the request may be formatted pursuant to an application layer protocol that uses HTTP as an underlying protocol. In other embodiments, the request is not based on HTTP. In block 630, the storage manager device 106 determines whether the presently selected replica is the primary replica. In the initial execution of block 630, the determination will be yes, because the storage manager device 106 selected the primary replica in block 618, as described above. If the storage manager device 106 determines that the selected replica is the primary replica, then the method advances to block 634. In block 634, the storage manager device 106 includes a hint in the generated request to indicate that the selected replica is the primary replica. For example, the storage manager device 106 may include a Boolean indicator of "true", a keyword such as "primary", or another indicator in the request. In embodiments in which the request is formatted as an HTTP request, the storage manager device 106 may include the hint in a header section of the HTTP request. If the storage manager device 106 instead determines that the selected replica is not the primary replica, the method may advance to block 632. In block 632, the storage manager device 106 includes a hint in the generated request to indicate that the selected replica is not the primary replica. For example, the storage manager device 106 may include a Boolean indicator of "false", a keyword such as "non-primary", or another indicator in the request. As described above, if the request is formatted as an HTTP request, the storage manager device 106 may include the hint in the header section of the HTTP request. In some embodiments, rather than performing block 632, the method 600 proceeds directly to block 636. In block 636, the storage manager device 106 transmits the replication request to the storage node that was selected in block 620. As described above, in some embodiments, the storage manager device 106 transmits the replication request using HTTP or a protocol that is based on HTTP. In other embodiments, the storage manager device 106 may transmit the replication request using a different communication protocol.

In block 638, the storage manager device 106 determines whether additional replicas are to be stored. For example, if the storage manager device 106 determined in block 604 that three replicas are to be stored and only the first replica (e.g., the primary replica) has been addressed, then the method 600 advances to block 640 to select the next replica. In block 642, the storage manager device 106 designates the replica selected in block 640 as not the primary replica, then the method loops back to block 620 of FIG. 6, in which the storage manager device 106 selects a storage node associated with the selected replica. Referring back to block 638, if the storage manager device 106 determines that there are no additional replicas to be stored, then the method 600 loops back to block 602 to await another data write request.

Figure 8:
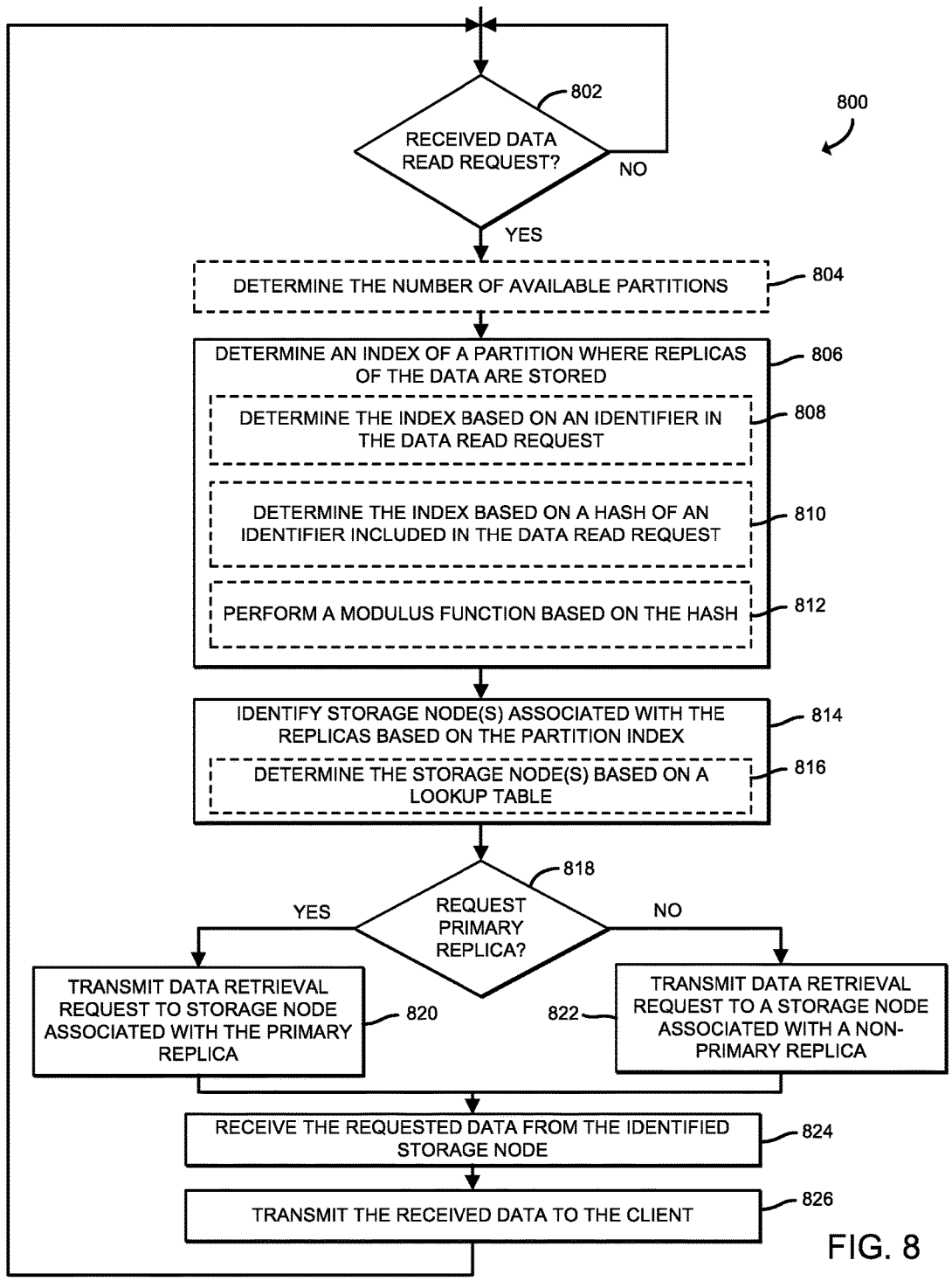
FIG. 8 is a simplified flow diagram of at least one embodiment of a method for reading data that may be performed by the data storage manager of FIG. 2.

Referring now to FIG. 8, in use, the storage manager device 106 may execute a method 800 for reading data in response to a data read request from the client device 102. The method 800 begins with block 802, in which the storage manager device 106 monitors for a data read request. Once the storage manager device 106 has received the data read request from the client device 102, the storage manager device 106 may determine the number of available partitions among the storage nodes connected to the storage network 108. The storage manager device 106 may determine the number of partitions by reading a predefined configuration setting, by querying the storage nodes of the storage network 108 for their respective partition numbers and totaling the results, or by another method. In block 806, the illustrative storage manager device 106 determines an index of a partition where replicas of the requested data are stored. Depending on the particular embodiment, the storage manager device 106 may determine the index of the partition in a number of ways. For example, as indicated in block 808, the storage manager device 106 may determine the index based on an identifier in the data read request. As an example, the storage manager device 106 may detect an identifier, such as a name, of the data or an identifier of a location of where the data is stored, and generate the index as a function of the identifier. As indicated in block 810, in some embodiments, the storage manager device 106 may generate a hash of an identifier of the data included in the data read request. The resulting hash may be indicative of the partition index. Further, as indicated in block 812, in some embodiments, the storage manager device 106 may perform a modulus function based on the hash generated in block 810. The result of modulus function may be the index of the partition in which replicas of the data are stored. In some embodiments, in performing the modulus function, the storage manager device 106 may set the hash as the dividend and the total number of partitions from block 804 as the divisor. In other embodiments, rather than using the total number of partitions as the divisor, the storage manager device 106 uses a weighting value that may vary over time and/or based on a load balancing function.

In block 814, the illustrative storage manager device 106 identifies at least one storage node associated with the replicas, based on the partition index. In some embodiments, as indicated in block 816, the storage manager device 106 determines the storage nodes based on one or more lookup tables. For example, the storage manager device 106 may access the drive lookup table 402 to determine one or more drives associated with the replicas of the data, based on the replica numbers and the partition index. Further, the storage manager device 106 may access the storage node lookup table to identify the storage nodes associated with the determined drives. In some embodiments, the storage manager device 106 performs the above process only with respect to the primary replica (e.g., the first replica), rather than also determining which storage nodes contain non-primary replicas of the data.

In block 818, the storage manager device 106 determines whether to request the primary replica. In some embodiments, the storage manager device 106 may be configured to always request the primary replica. In other embodiments, the storage manager device 106 may determine whether to request the primary replica based on load balancing considerations, such as a predefined frequency at which the storage node containing the primary replica may be requested to provide data, or based on other considerations. If the storage manager device 106 determines to request the primary replica, the method advances to block 820 in which the storage manager device 106 transmits the data retrieval request to the storage node associated with the primary replica. However, if the storage manager device 106 instead determines to request a non-primary replica, then the method advances to block 822, in which the storage manager device 106 transmits a data retrieval request to a storage node that is associated with a non-primary replica of the data. In block 824, the storage manager device 106 receives the requested data from the storage node that the storage manager device 106 sent the request to in one of blocks 820 or 822. In block 826, the storage manager device 106 transmits the received data to the client device 102 in response to the data read request. Next, the method 800 loops back to block 802, in which the storage manager device 106 monitors for another data read request.

Figure 9:
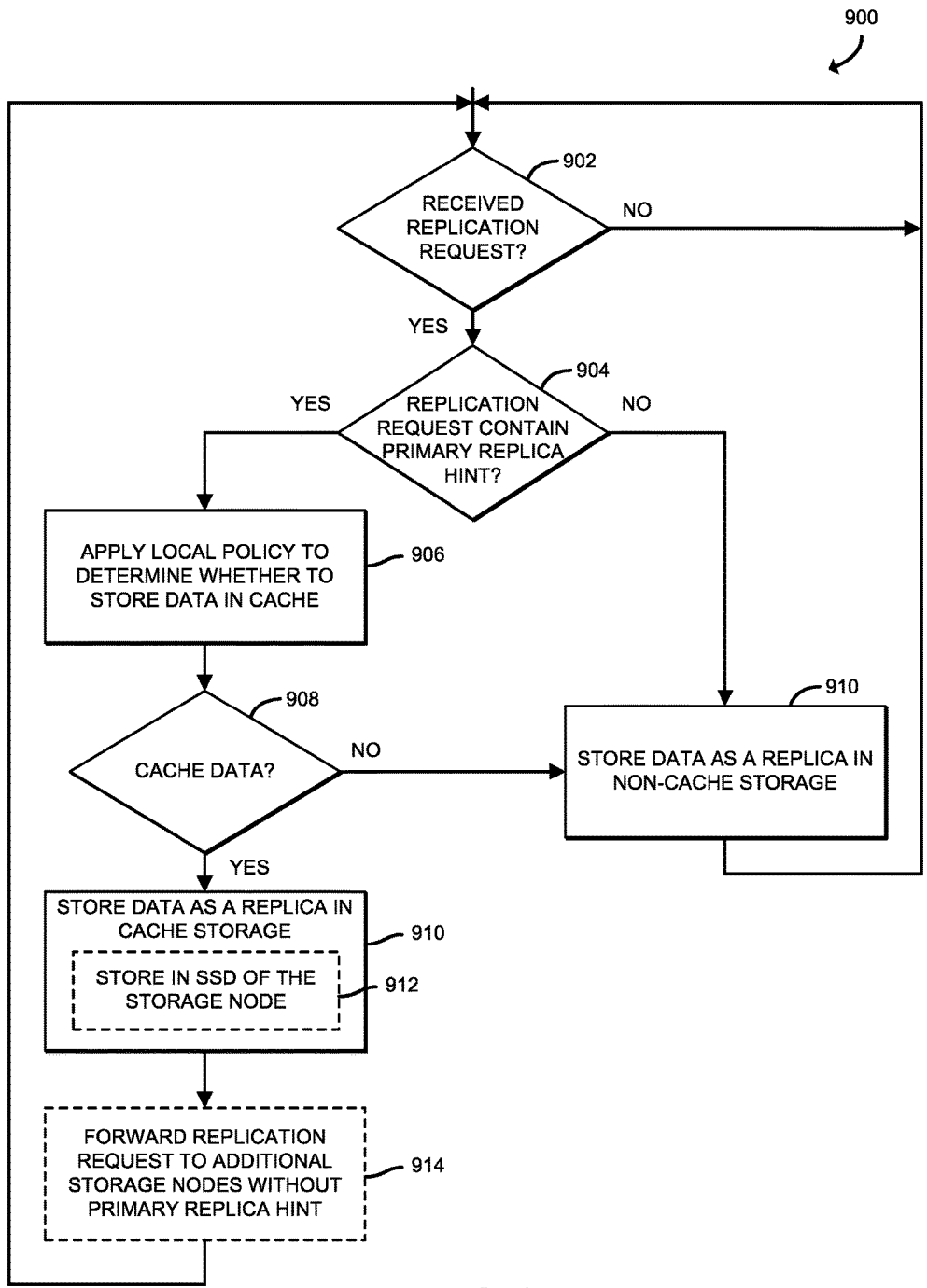
FIG. 9 is a simplified flow diagram of at least one embodiment of a method for replicating data that may be performed by the data storage node of FIG. 3.

Referring now to FIG. 9, in use, a storage node (e.g., the storage node 110) may execute a method 900 for replicating data in response to a replication request. The method 900 begins with block 902, in which the storage node 110 monitors for a received replication request. For example, the storage node 110 may receive a replication request from the storage manager device 106, as described with reference to FIG. 7. In some embodiments, the storage node 110 may receive the replication request from another storage node, such as in embodiments in which the storage node receiving the replication request is to store a non-primary replica of the data. Such embodiments are described above, with reference to FIG. 3. The replication request includes data to be stored as a replica in the cache storage device 330 or the non-cache storage device 340, as described herein. Once the storage node 110 has received a replication request, the method advances to block 904. In block 904, the storage node 110 determines whether the replication request contains a primary replica hint. As described above, with reference to FIG. 7, the replication request may contain a hint (i.e., an indicator) that the data is to be stored as a primary replica. Further, as described above, the hint may be a Boolean value of "true", a keyword, such as "primary", or another indicator of whether the data is to be stored as a primary replica. In some embodiments, the hint may be absent or may instead be a non-primary replica hint (e.g., a Boolean value of "false", a keyword such as "non-primary", etc.), either of which indicates that the data is to be stored as a non-primary replica. If the storage node 110 determines that the replication request does not contain a primary replica hint, the method 900 advances to block 906. In block 906, the storage node 110 applies a local policy to determine whether to store the data from the replication request in the cache storage device 330. The local policy may include one or more rules that may override the primary replica hint, such as rules pertaining to the size of the data to be stored in the cache storage device and the amount of unused storage capacity in the cache storage device 330. For example, if the amount of data to be stored exceeds the unused storage capacity of the cache storage device 330 or if the age of the cache storage device 330 is within a predefined range of its expected lifetime, the local policy may dictate that the data not be stored in the cache storage device 330. In block 908, the storage node 110 determines whether the local policy allows the data to be cached (i.e., stored in the cache storage device 330). If the local policy allows the data to be cached, the method 900 advances to block 910 in which the storage node 110 stores the data as a replica in the cache storage device 330. In some embodiments, as indicated in block 912, the cache storage device 330 is an SSD, and the storage node 110 stores the data as a replica in the SSD. In some embodiments, as described above with reference to FIGS. 3 and 5, the storage node 110 may forward the replication request to one or more additional (secondary) storage nodes (e.g., storage nodes 112, 114), as indicated in block 914. In doing so, the storage node 110 may remove the primary replica hint from the replication request, to indicate that the additional storage nodes are to store the data as non-primary replicas.

Referring back to block 908, if the storage node 110 instead determines that the local policy will not allow the data to be cached, the method 900 advances to block 910 in which the storage node 110 stores the data in the non-cache storage 340. The storage node 110 may write an indicator, for example in the local policy, to indicate that the primary replica was stored in the non-cache storage device 340 rather than the cache storage device 330. While the method 900 is described above as being performed by the storage node 110, it should be understood that any of other storage nodes in the system 100 (e.g., the storage nodes 112, 114, 116, and 118) may perform the method 900.

Figure 10:
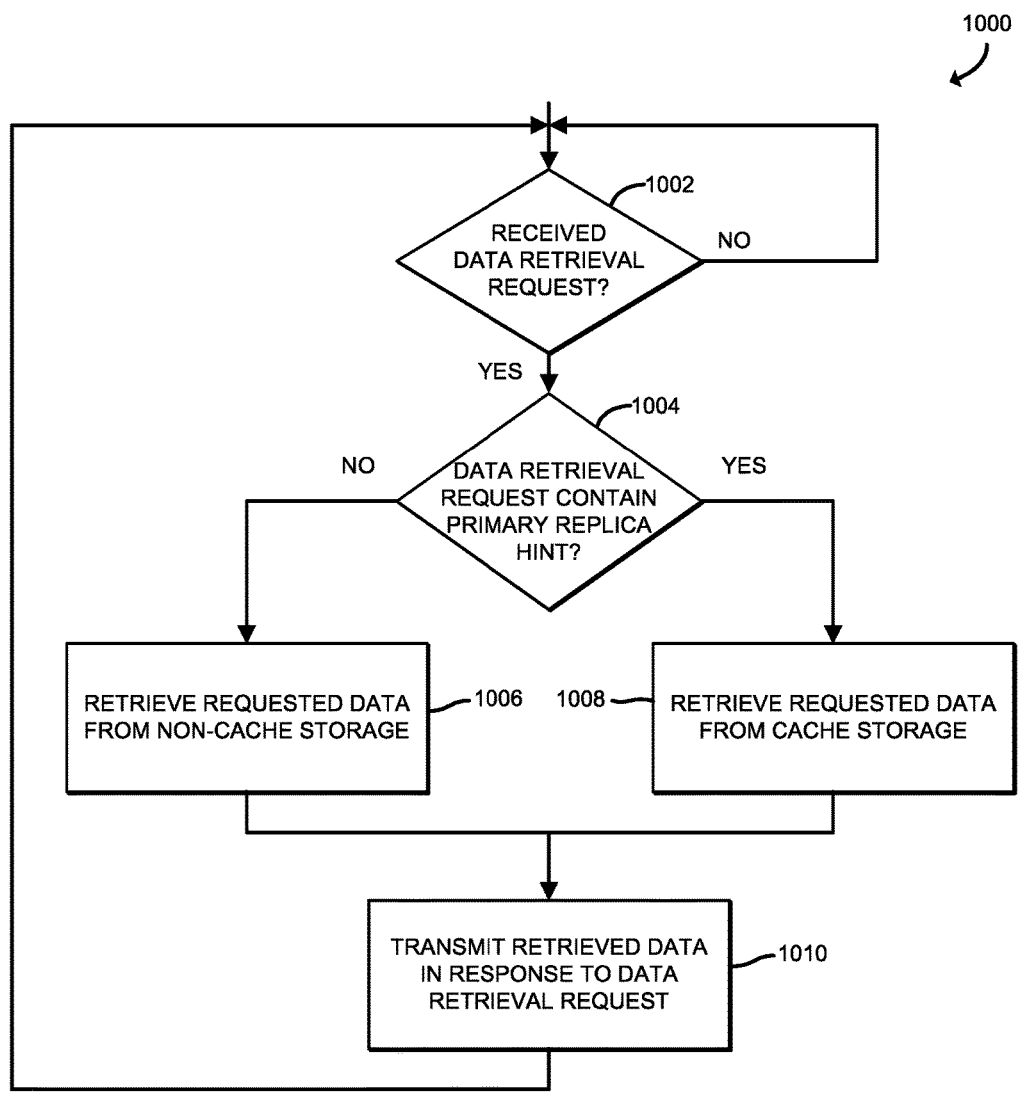
FIG. 10 is a simplified flow diagram of at least one embodiment of a method for retrieving data that may be performed by the data storage node of FIG. 3.

Referring now to FIG. 10, in use, a storage node (e.g., the storage node 110) may execute a method 1000 for retrieving data in response to a data retrieval request. The method 1000 begins in block 1002, in which the storage node 110 monitors for a data retrieval request. For example, the storage node 110 may receive a data retrieval request from the storage manager device 106, as described with reference to FIG. 8. Once the storage node 110 receives a data retrieval request, the method 1000 advances to block 1004 in which the storage node 110 determines whether the data retrieval request contains a primary replica hint. As described above, with reference to FIG. 8, the storage manager device 106 may include a hint (i.e., an indicator) in the data retrieval request indicating that the data to be retrieved is associated with a primary replica. The hint may be embodied as a Boolean value such as "true", a keyword such as "primary", or another indicator that indicates that the data to be retrieved is associated with a primary replica. If the storage node 110 determines that the data retrieval request does not contain a primary replica hint, then the method 1000 advances to block 1006 in which the storage node 110 retrieves the requested data from the non-cache storage device 340 (e.g., an HDD) of the storage node 110. Otherwise, if the storage node 110 determines that the data retrieval request does contain a primary replica hint, then the method 1000 advances to block 1008 in which the storage node 110 retrieves the requested data from the cache storage device 330 (e.g., an SSD). Regardless, the method 1000 then advances to block 1010 in which the storage node 110 transmits the retrieved data in response to the data retrieval request. For example, the storage node 110 may transmit the retrieved data to the storage manager device 106. While the method 1000 is described above as being performed by the storage node 110, it should be understood that any of other storage nodes in the system 100 (e.g., the storage nodes 112, 114, 116, and 118) may perform the method 1000.

EXAMPLES

Illustrative examples of the technologies disclosed herein are provided below. An embodiment of the technologies may include any one or more, and any combination of, the examples described below.

Example 1 includes a storage manager device for managing replica caching in a distributed storage system that includes a plurality of storage nodes, the storage manager device comprising one or more processors; one or more memory devices having stored therein a plurality of instructions that, when executed by the one or more processors, cause the storage manager device to receive a data write request from a client device to store replicas of data; designate one of the replicas as a primary replica; select (i) a first storage node of the plurality of storage nodes to store the primary replica of the data in a cache storage of the first storage node and (ii) at least a second storage node to store a non-primary replica of the data in a non-cache storage of the second storage node; include a hint in a first replication request of a plurality of replication requests to be transmitted, wherein the first replication request is to the first storage node and the hint is to indicate that the first storage node is to store the data in the cache storage of the first storage node as the primary replica; and transmit the replication requests to the respective storage nodes to store replicas of the data.

Example 2 includes the subject matter of Example 1, and wherein to transmit the replication requests to the respective storage nodes comprises to transmit the first replication request to the first storage node to cause the first storage node to store the data in the cache storage of the first storage node; and transmit a second replication request to the second storage node to cause the second storage node to store the data in the non-cache storage of the second storage node, wherein the second replication request does not include the hint.

Example 3 includes the subject matter of any of Examples 1 and 2, and wherein the plurality of instructions, when executed by the one or more processors, further cause the storage manager device to determine an index of a partition in which to store the replicas based on an identifier in the data write request; and select the first storage node and the second storage node from the plurality of storage nodes based on the partition index.

Example 4 includes the subject matter of any of Examples 1-3, and wherein the plurality of instructions, when executed by the one or more processors, further cause the storage manager device to generate a hash based on an identifier included in the data write request; perform a modulus operation on the hash to determine a partition index in which to store the replicas; and select the first storage node and the second storage node from the plurality of storage nodes based on the partition index.

Example 5 includes the subject matter of any of Examples 1-4, and wherein the plurality of instructions, when executed by the one or more processors, further cause the storage manager device to generate a hash based on a uniform resource locator (URL) included in the data write request; and select the first storage node and the second storage node from the plurality of storage nodes based on the hash.

Example 6 includes the subject matter of any of Examples 1-5, and wherein the plurality of instructions, when executed by the one or more processors, further cause the storage manager device to determine an index of a partition in which to store the replicas; determine a first storage drive in which to store the primary replica, based on the index of the partition; determine a second storage drive in which to store the non-primary replica, based on the index of the partition; determine the first storage node based on the determined first storage drive; and determine the second storage node based on the determined second storage drive.

Example 7 includes the subject matter of any of Examples 1-6, and wherein to determine the first storage drive in which to store the primary replica comprises to determine a solid state drive; and to determine the second storage drive in which to store the non-primary replica, comprises to determine a hard disk drive.

Example 8 includes the subject matter of any of Examples 1-7, and wherein the plurality of instructions, when executed by the one or more processors, further cause the storage manager device to transmit the replication requests as hypertext transfer protocol (HTTP) requests.

Example 9 includes the subject matter of any of Examples 1-8, and wherein the plurality of instructions, when executed by the one or more processors, further cause the storage manager device to receive a data read request to retrieve the data; identify the storage node in which the primary replica of the data is stored based on an identifier included in the data read request; and transmit a data retrieval request to the identified storage node to retrieve the primary replica of the data from a cache of the identified data storage node.

Example 10 includes the subject matter of any of Examples 1-9, and wherein the plurality of instructions, when executed by the one or more processors, further cause the storage manager device to receive a data read request to retrieve the data; identify an index of a partition in which replicas of the data are stored; identify storage nodes associated with the replicas based on the partition index; determine whether to request a cached replica of the data or a non-cached replica of the data; and transmit a data retrieval request to the first storage node to retrieve the cached replica of the data in response to a determination to retrieve the cached replica.

Example 11 includes the subject matter of any of Examples 1-10 and wherein to identify an index of a partition in which replicas of the data are stored comprises to generate a hash of a uniform resource locator (URL) included in the data read request; and perform a modulus function on the hash.

Example 12 includes the subject matter of any of Examples 1-11, and wherein to transmit the data retrieval request comprises to transmit the data retrieval request with a hint to retrieve the cached replica of the data.

Example 13 includes the subject matter of any of Examples 1-12, and wherein the plurality of instructions, when executed by the one or more processors, further cause the storage manager device to receive a data read request to retrieve the data; identify an index of a partition in which replicas of the data are stored; identify storage nodes associated with the replicas, based on the partition index; determine whether to request a cached replica of the data or a non-cached replica of the data based on a load balance analysis; and transmit a data retrieval request to the second storage node to retrieve the non-cached replica of the data in response to a determination to retrieve the non-cached replica.

Example 14 includes a method for managing replica caching in a distributed storage system that includes a plurality of storage nodes, the method comprising receiving, by a storage manager device, a data write request from a client device to store replicas of data; designating, by the storage manager device, one of the replicas as a primary replica; selecting, by the storage manager device, (i) a first storage node of the plurality of storage nodes to store the primary replica of the data in a cache storage of the first storage node and (ii) at least a second storage node to store a non-primary replica of the data in a non-cache storage of the second storage node; including, by the storage manager device, a hint in a first replication request of a plurality of replication requests to be transmitted, wherein the first replication request is to the first storage node and the hint is to indicate that the first storage node is to store the data in the cache storage of the first storage node as the primary replica; and transmitting, by the storage manager device, the replication requests to the respective storage nodes to store replicas of the data.

Example 15 includes the subject matter of Example 14, and wherein transmitting the replication requests to the respective storage nodes comprises transmitting, by the storage manager device, the first replication request to the first storage node to cause the first storage node to store the data in the cache storage of the first storage node; and transmitting, by the storage manager device, a second replication request to the second storage node to cause the second storage node to store the data in the non-cache storage of the second storage node, wherein the second replication request does not include the hint.

Example 16 includes the subject matter of any of Examples 14 and 15, and further including determining, by the storage manager device, an index of a partition in which to store the replicas based on an identifier in the data write request; and selecting, by the storage manager device, the first storage node and the second storage node from the plurality of storage nodes based on the partition index.

Example 17 includes the subject matter of any of Examples 14-16, and further including generating, by the storage manager device, a hash based on an identifier included in the data write request; performing, by the storage manager device, a modulus operation on the hash to determine a partition index in which to store the replicas; and selecting, by the storage manager device, the first storage node and the second storage node from the plurality of storage nodes based on the partition index.

Example 18 includes the subject matter of any of Examples 14-17, and further including generating, by the storage manager device, a hash based on a uniform resource locator (URL) included in the data write request; and selecting, by the storage manager device, the first storage node and the second storage node from the plurality of storage nodes based on the hash.

Example 19 includes the subject matter of any of Examples 14-18, and further including determining, by the storage manager device, an index of a partition in which to store the replicas; determining, by the storage manager device, a first storage drive in which to store the primary replica, based on the index of the partition; determining, by the storage manager device, a second storage drive in which to store the non-primary replica, based on the index of the partition; determining, by the storage manager device, the first storage node based on the determined first storage drive; and determining, by the storage manager device, the second storage node based on the determined second storage drive.

Example 20 includes the subject matter of any of Examples 14-19, and wherein determining the first storage drive in which to store the primary replica comprises determining a solid state drive; and determining the second storage drive in which to store the non-primary replica comprises determining a hard disk drive.

Example 21 includes the subject matter of any of Examples 14-20, and wherein transmitting the replication requests comprises transmitting the replication requests as hypertext transfer protocol (HTTP) requests.

Example 22 includes the subject matter of any of Examples 14-21, and further including receiving, by the storage manager device, a data read request to retrieve the data; identifying, by the storage manager device, the storage node in which the primary replica of the data is stored based on an identifier included in the data read request; and transmitting, by the storage manager device, a data retrieval request to the identified storage node to retrieve the primary replica of the data from a cache of the identified data storage node.

Example 23 includes the subject matter of any of Examples 14-22, and further including receiving, by the storage manager device, a data read request to retrieve the data; identifying, by the storage manager device, an index of a partition in which replicas of the data are stored; identifying, by the storage manager device, storage nodes associated with the replicas based on the partition index; determining, by the storage manager device, whether to request a cached replica of the data or a non-cached replica of the data; and transmitting, by the storage manager device, a data retrieval request to the first storage node to retrieve the cached replica of the data in response to a determination to retrieve the cached replica.

Example 24 includes the subject matter of any of Examples 14-23, and wherein identifying an index of a partition in which replicas of the data are stored comprises generating, by the storage manager device, a hash of a uniform resource locator (URL) included in the data read request; and performing, by the storage manager device, a modulus function on the hash.

Example 25 includes the subject matter of any of Examples 14-24, and wherein transmitting the data retrieval request comprises transmitting the data retrieval request with a hint to retrieve the cached replica of the data.

Example 26 includes the subject matter of any of Examples 14-25, and further including receiving, by the storage manager device, a data read request to retrieve the data; identifying, by the storage manager device, an index of a partition in which replicas of the data are stored; identifying, by the storage manager device, storage nodes associated with the replicas, based on the partition index; determining, by the storage manager device, whether to request a cached replica of the data or a non-cached replica of the data based on a load balance analysis; and transmitting, by the storage manager device, a data retrieval request to the second storage node to retrieve the non-cached replica of the data in response to a determination to retrieve the non-cached replica.

Example 27 includes a storage manager device comprising one or more processors; and a memory having stored therein a plurality of instructions that when executed by the one or more processors cause the storage manager device to perform the method of any of Examples 14-26.

Example 28 includes one or more machine readable storage media comprising a plurality of instructions stored thereon that in response to being executed result in a storage manager device performing the method of any of Examples 14-27.

Example 29 includes a storage manager device for managing replica caching in a distributed storage system that includes a plurality of storage nodes, the storage manager device comprising network communication circuitry to (i) receive a data write request from a client device to store replicas of data; and (ii) transmit the replication requests to the respective storage nodes to store replicas of the data; primary replica selector circuitry to designate one of the replicas as a primary replica; storage node selector circuitry to select (i) a first storage node of the plurality of storage nodes to store the primary replica of the data in a cache storage of the first storage node and (ii) at least a second storage node to store a non-primary replica of the data in a non-cache storage of the second storage node; and hint generator circuitry to include a hint in a first replication request of a plurality of replication requests to be transmitted, wherein the first replication request is to the first storage node and the hint is to indicate that the first storage node is to store the data in the cache storage of the first storage node as the primary replica.

Example 30 includes the subject matter of Example 29, and wherein to transmit the replication requests to the respective storage nodes comprises to transmit the first replication request to the first storage node to cause the first storage node to store the data in the cache storage of the first storage node; and transmit a second replication request to the second storage node to cause the second storage node to store the data in the non-cache storage of the second storage node, wherein the second replication request does not include the hint.

Example 31 includes the subject matter of any of Examples 29 and 30, and wherein the storage node selector circuitry is further to determine an index of a partition in which to store the replicas based on an identifier in the data write request; and select the first storage node and the second storage node from the plurality of storage nodes based on the partition index.

Example 32 includes the subject matter of any of Examples 29-31, and wherein the storage node selector circuitry is further to generate a hash based on an identifier included in the data write request; perform a modulus operation on the hash to determine a partition index in which to store the replicas; and select the first storage node and the second storage node from the plurality of storage nodes based on the partition index.

Example 33 includes the subject matter of any of Examples 29-32, and wherein the storage node selector circuitry is further to generate a hash based on a uniform resource locator (URL) included in the data write request; and select the first storage node and the second storage node from the plurality of storage nodes based on the hash.

Example 34 includes the subject matter of any of Examples 29-33, and wherein the storage node selector circuitry is further to determine an index of a partition in which to store the replicas; determine a first storage drive in which to store the primary replica, based on the index of the partition; determine a second storage drive in which to store the non-primary replica, based on the index of the partition; determine the first storage node based on the determined first storage drive; and determine the second storage node based on the determined second storage drive.

Example 35 includes the subject matter of any of Examples 29-34, and wherein to determine the first storage drive in which to store the primary replica comprises to determine a solid state drive; and to determine the second storage drive in which to store the non-primary replica comprises to determine a hard disk drive.

Example 36 includes the subject matter of any of Examples 29-35, and wherein the network communication circuitry is further to transmit the replication requests as hypertext transfer protocol (HTTP) requests.

Example 37 includes the subject matter of any of Examples 29-36, and wherein the network communication circuitry is further to receive a data read request to retrieve the data; the storage node selector circuitry is further to identify the storage node in which the primary replica of the data is stored based on an identifier included in the data read request; and the network communication circuitry is further to transmit a data retrieval request to the identified storage node to retrieve the primary replica of the data from a cache of the identified data storage node.

Example 38 includes the subject matter of any of Examples 29-37, and wherein the network communication circuitry is further to receive a data read request to retrieve the data; the storage node selector circuitry is further to identify an index of a partition in which replicas of the data are stored; identify storage nodes associated with the replicas based on the partition index; and determine whether to request a cached replica of the data or a non-cached replica of the data; and the network communication circuitry is further to transmit a data retrieval request to the first storage node to retrieve the cached replica of the data in response to a determination to retrieve the cached replica.

Example 39 includes the subject matter of any of Examples 29-38, and wherein to identify an index of a partition in which replicas of the data are stored comprises to generate a hash of a uniform resource locator (URL) included in the data read request; and perform a modulus function on the hash.

Example 40 includes the subject matter of any of Examples 29-39, and wherein to transmit the data retrieval request comprises to transmit the data retrieval request with a hint to retrieve the cached replica of the data.

Example 41 includes the subject matter of any of Examples 29-40, and wherein the network communication circuitry is further to receive a data read request to retrieve the data; the storage node selector circuitry is further to identify an index of a partition in which replicas of the data are stored; identify storage nodes associated with the replicas, based on the partition index; and determine whether to request a cached replica of the data or a non-cached replica of the data based on a load balance analysis; and the network communication circuitry is further to transmit a data retrieval request to the second storage node to retrieve the non-cached replica of the data in response to a determination to retrieve the non-cached replica.

Example 42 includes a storage manager device for managing replica caching in a distributed storage system that includes a plurality of storage nodes, the storage manager device comprising network communication circuitry for receiving a data write request from a client device to store replicas of data; means for designating one of the replicas as a primary replica; means for selecting (i) a first storage node of the plurality of storage nodes to store the primary replica of the data in a cache storage of the first storage node and (ii) at least a second storage node to store a non-primary replica of the data in a non-cache storage of the second storage node; and means for including a hint in a first replication request of a plurality of replication requests to be transmitted, wherein the first replication request is to the first storage node and the hint is to indicate that the first storage node is to store the data in the cache storage of the first storage node as the primary replica; wherein the network communication circuitry is further for transmitting the replication requests to the respective storage nodes to store replicas of the data.

Example 43 includes the subject matter of Example 42, and wherein the network communication circuitry for transmitting the replication requests to the respective storage nodes further comprises circuitry for transmitting the first replication request to the first storage node to cause the first storage node to store the data in the cache storage of the first storage node; and circuitry transmitting a second replication request to the second storage node to cause the second storage node to store the data in the non-cache storage of the second storage node, wherein the second replication request does not include the hint.

Example 44 includes the subject matter of any of Examples 42 and 43, and further including means for determining an index of a partition in which to store the replicas based on an identifier in the data write request; and means for selecting the first storage node and the second storage node from the plurality of storage nodes based on the partition index.

Example 45 includes the subject matter of any of Examples 42-44, and further including means for generating a hash based on an identifier included in the data write request; means for performing a modulus operation on the hash to determine a partition index in which to store the replicas; and means for selecting the first storage node and the second storage node from the plurality of storage nodes based on the partition index.

Example 46 includes the subject matter of any of Examples 42-45, and further including means for generating a hash based on a uniform resource locator (URL) included in the data write request; and means for selecting the first storage node and the second storage node from the plurality of storage nodes based on the hash.

Example 47 includes the subject matter of any of Examples 42-46, and further including means for determining an index of a partition in which to store the replicas; means for determining a first storage drive in which to store the primary replica, based on the index of the partition; means for determining a second storage drive in which to store the non-primary replica, based on the index of the partition; means for determining the first storage node based on the determined first storage drive; and means for determining the second storage node based on the determined second storage drive.

Example 48 includes the subject matter of any of Examples 42-47, and wherein the means for determining the first storage drive in which to store the primary replica comprises means for determining a solid state drive; and the means for determining the second storage drive in which to store the non-primary replica comprises means for determining a hard disk drive.

Example 49 includes the subject matter of any of Examples 42-48, and wherein the network communication circuitry for transmitting the replication requests comprises circuitry for transmitting the replication requests as hypertext transfer protocol (HTTP) requests.

Example 50 includes the subject matter of any of Examples 42-49, and further including circuitry for receiving a data read request to retrieve the data; means for identifying the storage node in which the primary replica of the data is stored based on an identifier included in the data read request; and circuitry for transmitting a data retrieval request to the identified storage node to retrieve the primary replica of the data from a cache of the identified data storage node.

Example 51 includes the subject matter of any of Examples 42-50, and further including circuitry for receiving a data read request to retrieve the data; means for identifying an index of a partition in which replicas of the data are stored; means for identifying storage nodes associated with the replicas based on the partition index; means for determining whether to request a cached replica of the data or a non-cached replica of the data; and circuitry for transmitting a data retrieval request to the first storage node to retrieve the cached replica of the data in response to a determination to retrieve the cached replica.

Example 52 includes the subject matter of any of Examples 42-51, and wherein the means for identifying an index of a partition in which replicas of the data are stored comprises means for generating a hash of a uniform resource locator (URL) included in the data read request; and means for performing a modulus function on the hash.

Example 53 includes the subject matter of any of Examples 42-52, and wherein the circuitry for transmitting the data retrieval request comprises circuitry for transmitting the data retrieval request with a hint to retrieve the cached replica of the data.

Example 54 includes the subject matter of any of Examples 42-53, and further including circuitry for receiving a data read request to retrieve the data; means for identifying an index of a partition in which replicas of the data are stored; means for identifying storage nodes associated with the replicas, based on the partition index; means for determining whether to request a cached replica of the data or a non-cached replica of the data based on a load balance analysis; and circuitry for transmitting a data retrieval request to the second storage node to retrieve the non-cached replica of the data in response to a determination to retrieve the non-cached replica.

Example 55 includes a storage node comprising a cache storage; a non-cache storage; one or more processors; and one or more memory devices having stored therein a plurality of instructions that, when executed by the one or more processors, cause the storage node to receive a replication request to store data in the storage node; determine whether the replication request includes a hint to store the data as a primary replica in the cache storage; select one of the cache storage or the non-cache storage to store the data in based on the determination of whether the replication request includes the hint; and store the data in the selected one of the cache storage or the non-cache storage.

Example 56 includes the subject matter of Example 55, and wherein to select one of the cache storage or the non-cache storage comprises to select the cache storage based on a determination that the replication request includes the hint.

Example 57 includes the subject matter of any of Examples 55 and 56, and wherein to select one of the cache storage or the non-cache storage comprises to select the non-cache storage based on a determination that the replication request does not include the hint.

Example 58 includes the subject matter of any of Examples 55-57, and wherein to select one of the cache storage or the non-cache storage comprises to select one of the cache storage or the non-cache storage based additionally on a predefined local policy of the storage node.

Example 59 includes the subject matter of any of Examples 55-58, and wherein the replication request includes the hint and the plurality of instructions, when executed by the one or more processors, further cause the storage node to transmit the replication request to at least one additional storage node without the hint to cause the additional storage node to store the data as a non-primary replica.

Example 60 includes the subject matter of any of Examples 55-59, and wherein the hint is a first hint and the plurality of instructions, when executed by the one or more processors, further cause the storage node to receive a data retrieval request from a storage manager device to retrieve a replica; determine whether the data retrieval request includes a second hint that indicates that the replica is a primary replica; retrieve the replica from the cache storage in response to a determination that the data retrieval request includes the second hint; and transmit the retrieved replica to the storage manager device in response to the data retrieval request.

Example 61 includes the subject matter of any of Examples 55-60, and wherein the hint is a first hint and the plurality of instructions, when executed by the one or more processors, further cause the storage node to receive a data retrieval request from a storage manager device to retrieve a replica; determine whether the data retrieval request includes a second hint that indicates that the replica is a non-primary replica; retrieve the replica from the non-cache storage in response to a determination that the data retrieval request does not include the second hint; and transmit the retrieved replica to the storage manager device in response to the data retrieval request.

Example 62 includes a method comprising receiving, by a storage node, a replication request to store data in the storage node; determining, by the storage node, whether the replication request includes a hint to store the data as a primary replica in a cache storage of the storage node; selecting, by the storage node, one of the cache storage or a non-cache storage of the storage node to store the data in based on the determination of whether the replication request includes the hint; and storing, by the storage node, the data in the selected one of the cache storage or the non-cache storage.

Example 63 includes the subject matter of any of Examples 62, and wherein selecting one of the cache storage or the non-cache storage comprises selecting the cache storage based on a determination that the replication request includes the hint.

Example 64 includes the subject matter of any of Examples 62 and 63, and wherein selecting one of the cache storage or the non-cache storage comprises selecting the non-cache storage based on a determination that the replication request does not include the hint.

Example 65 includes the subject matter of any of Examples 62-64, and wherein selecting one of the cache storage or the non-cache storage comprises selecting one of the cache storage or the non-cache storage based additionally on a predefined local policy of the storage node.

Example 66 includes the subject matter of any of Examples 62-65, and wherein the replication request includes the hint, the method further comprising transmitting, by the storage node, the replication request to at least one additional storage node without the hint to cause the additional storage node to store the data as a non-primary replica.

Example 67 includes the subject matter of any of Examples 62-66, and wherein the hint is a first hint, the method further comprising receiving, by the storage node, a data retrieval request from a storage manager device to retrieve a replica; determining, by the storage node, whether the data retrieval request includes a second hint that indicates that the replica is a primary replica; retrieving, by the storage node, the replica from the cache storage in response to a determination that the data retrieval request includes the second hint; and transmitting, by the storage node, the retrieved replica to the storage manager device in response to the data retrieval request.

Example 68 includes the subject matter of any of Examples 62-67, and wherein the hint is a first hint, the method further comprising receiving, by the storage node, a data retrieval request from a storage manager device to retrieve a replica; determining, by the storage node, whether the data retrieval request includes a second hint that indicates that the replica is a non-primary replica; retrieving, by the storage node, the replica from the non-cache storage in response to a determination that the data retrieval request does not include the second hint; and transmitting, by the storage node, the retrieved replica to the storage manager device in response to the data retrieval request.

Example 69 includes a storage node comprising one or more processors; and a memory having stored therein a plurality of instructions that when executed by the one or more processors cause the storage node to perform the method of any of Examples 62-68.

Example 70 includes one or more machine readable storage media comprising a plurality of instructions stored thereon that in response to being executed result in a storage node performing the method of any of Examples 62-69.

Example 71 includes a storage node comprising a cache storage; a non-cache storage; network communication circuitry to receive a replication request to store data in the storage node; and replica manager circuitry to (i) determine whether the replication request includes a hint to store the data as a primary replica in the cache storage; (ii) select one of the cache storage or the non-cache storage to store the data in based on the determination of whether the replication request includes the hint; and (iii) store the data in the selected one of the cache storage or the non-cache storage.

Example 72 includes the subject matter of Example 71, and wherein to select one of the cache storage or the non-cache storage comprises to select the cache storage based on a determination that the replication request includes the hint.

Example 73 the subject matter of any of Examples 71 and 72, and wherein to select one of the cache storage or the non-cache storage comprises to select the non-cache storage based on a determination that the replication request does not include the hint.

Example 74 includes the subject matter of any of Examples 71-73, and wherein to select one of the cache storage or the non-cache storage comprises to select one of the cache storage or the non-cache storage based additionally on a predefined local policy of the storage node.

Example 75 includes the subject matter of any of Examples 71-74, and wherein the replication request includes the hint and the network communication circuitry is further to transmit the replication request to at least one additional storage node without the hint to cause the additional storage node to store the data as a non-primary replica.

Example 76 includes the subject matter of any of Examples 71-75, and wherein the hint is a first hint and wherein the network communication circuitry is further to receive a data retrieval request from a storage manager device to retrieve a replica; the replica manager circuitry is further to: determine whether the data retrieval request includes a second hint that indicates that the replica is a primary replica; retrieve the replica from the cache storage in response to a determination that the data retrieval request includes the second hint; and the network communication circuitry is further to transmit the retrieved replica to the storage manager device in response to the data retrieval request.

Example 77 includes the subject matter of any of Examples 71-76, and wherein the hint is a first hint and wherein the network communication circuitry is further to receive a data retrieval request from a storage manager device to retrieve a replica; the replica manager circuitry is further to determine whether the data retrieval request includes a second hint that indicates that the replica is a non-primary replica; and retrieve the replica from the non-cache storage in response to a determination that the data retrieval request does not include the second hint; and the network communication circuitry is further to transmit the retrieved replica to the storage manager device in response to the data retrieval request.

Example 78 includes a storage node comprising a cache storage; a non-cache storage; network communication circuitry for receiving a replication request to store data in the storage node; means for determining whether the replication request includes a hint to store the data as a primary replica in the cache storage of the storage node; means for selecting one of the cache storage or the non-cache storage of the storage node to store the data in based on the determination of whether the replication request includes the hint; and means for storing the data in the selected one of the cache storage or the non-cache storage.

Example 79 includes the subject matter of Example 78, wherein the means for selecting one of the cache storage or the non-cache storage comprises means for selecting the cache storage based on a determination that the replication request includes the hint.

Example 80 includes the subject matter of any of Examples 78 and 79, and wherein the means for selecting one of the cache storage or the non-cache storage comprises means for selecting the non-cache storage based on a determination that the replication request does not include the hint.

Example 81 includes the subject matter of any of Examples 78-80, and wherein the means for selecting one of the cache storage or the non-cache storage comprises means for selecting one of the cache storage or the non-cache storage based additionally on a predefined local policy of the storage node.

Example 82 includes the subject matter of any of Examples 78-81, and wherein the replication request includes the hint, and the network communication circuitry comprises circuitry for transmitting the replication request to at least one additional storage node without the hint to cause the additional storage node to store the data as a non-primary replica.

Example 83 includes the subject matter of any of Examples 78-82, and wherein the hint is a first hint, the storage node further comprising circuitry for receiving a data retrieval request from a storage manager device to retrieve a replica; means for determining whether the data retrieval request includes a second hint that indicates that the replica is a primary replica; means for retrieving the replica from the cache storage in response to a determination that the data retrieval request includes the second hint; and circuitry for transmitting the retrieved replica to the storage manager device in response to the data retrieval request.

Example 84 includes the subject matter of any of Examples 78-83, and wherein the hint is a first hint, the storage node further comprising circuitry for receiving a data retrieval request from a storage manager device to retrieve a replica; means for determining whether the data retrieval request includes a second hint that indicates that the replica is a non-primary replica; means for retrieving the replica from the non-cache storage in response to a determination that the data retrieval request does not include the second hint; and circuitry for transmitting the retrieved replica to the storage manager device in response to the data retrieval request.

The invention claimed is:

1. A storage manager device for managing replica caching in a distributed storage system that includes a plurality of storage nodes, the storage manager device comprising:
one or more processors;
one or more memory devices having stored therein a plurality of instructions that, when executed by the one or more processors, cause the storage manager device to:
receive a data write request from a client device to store replicas of data;
designate one of the replicas as a primary replica;
select (i) a first storage node of the plurality of storage nodes to store the primary replica of the data in a cache storage of the first storage node and (ii) at least a second storage node to store a non-primary replica of the data in a non-cache storage of the second storage node;
include a hint in a first replication request of a plurality of replication requests to be transmitted, wherein the first replication request is to the first storage node and the hint is to indicate that the first storage node is to store the data in the cache storage of the first storage node as the primary replica; and
transmit the replication requests to the respective storage nodes to store replicas of the data.

2. The storage manager device of claim 1, wherein to transmit the replication requests to the respective storage nodes comprises to:
transmit the first replication request to the first storage node to cause the first storage node to store the data in the cache storage of the first storage node; and
transmit a second replication request to the second storage node to cause the second storage node to store the data in the non-cache storage of the second storage node, wherein the second replication request does not include the hint.

3. The storage manager device of claim 1, wherein the plurality of instructions, when executed by the one or more processors, further cause the storage manager device to:
determine an index of a partition in which to store the replicas based on an identifier in the data write request; and
select the first storage node and the second storage node from the plurality of storage nodes based on the partition index.

4. The storage manager device of claim 1, wherein the plurality of instructions, when executed by the one or more processors, further cause the storage manager device to:
generate a hash based on an identifier included in the data write request;
perform a modulus operation on the hash to determine a partition index in which to store the replicas; and
select the first storage node and the second storage node from the plurality of storage nodes based on the partition index.

5. The storage manager device of claim 1, wherein the plurality of instructions, when executed by the one or more processors, further cause the storage manager device to:
generate a hash based on a uniform resource locator (URL) included in the data write request; and
select the first storage node and the second storage node from the plurality of storage nodes based on the hash.

6. The storage manager device of claim 1, wherein the plurality of instructions, when executed by the one or more processors, further cause the storage manager device to:
determine an index of a partition in which to store the replicas;
determine a first storage drive in which to store the primary replica, based on the index of the partition;

determine a second storage drive in which to store the non-primary replica, based on the index of the partition;

determine the first storage node based on the determined first storage drive; and determine the second storage node based on the determined second storage drive.

7. The storage manager device of claim 6, wherein:

to determine the first storage drive in which to store the primary replica comprises to determine a solid state drive; and to determine the second storage drive in which to store the non-primary replica, comprises to determine a hard disk drive.

8. The storage manager device of claim 1, wherein the plurality of instructions, when executed by the one or more processors, further cause the storage manager device to transmit the replication requests as hypertext transfer protocol (HTTP) requests.

9. The storage manager device of claim 1, wherein the plurality of instructions, when executed by the one or more processors, further cause the storage manager device to:

receive a data read request to retrieve the data;

identify the storage node in which the primary replica of the data is stored based on an identifier included in the data read request; and transmit a data retrieval request to the identified storage node to retrieve the primary replica of the data from a cache of the identified data storage node.

10. The storage manager device of claim 1, wherein the plurality of instructions, when executed by the one or more processors, further cause the storage manager device to:

receive a data read request to retrieve the data;

identify an index of a partition in which replicas of the data are stored;

identify storage nodes associated with the replicas based on the partition index;

determine whether to request a cached replica of the data or a non-cached replica of the data; and transmit a data retrieval request to the first storage node to retrieve the cached replica of the data in response to a determination to retrieve the cached replica.

11. The storage manager device of claim 10, wherein to identify an index of a partition in which replicas of the data are stored comprises to:

generate a hash of a uniform resource locator (URL) included in the data read request; and perform a modulus function on the hash.

12. One or more non-transitory computer-readable storage media comprising a plurality of instructions stored thereon that in response to being executed, cause a storage manager device for managing replica caching in a distributed storage system that includes a plurality of storage nodes to:

receive a data write request from a client device to store replicas of data;

designate one of the replicas as a primary replica;

select (i) a first storage node of the plurality of storage nodes to store the primary replica of the data in a cache storage of the first storage node and (ii) at least a second storage node to store a non-primary replica of the data in a non-cache storage of the second storage node;

include a hint in a first replication request of a plurality of replication requests to be transmitted, wherein the first replication request is to the first storage node and the hint is to indicate that the first storage node is to store the data in the cache storage of the first storage node as the primary replica; and transmit the replication requests to the respective storage nodes to store replicas of the data.

13. The one or more non-transitory computer-readable storage media of claim 12, wherein to transmit the replication requests to the respective storage nodes comprises to:

transmit the first replication request to the first storage node to cause the first storage node to store the data in the cache storage of the first storage node; and transmit a second replication request to the second storage node to cause the second storage node to store the data in the non-cache storage of the second storage node, wherein the second replication request does not include the hint.

14. The one or more non-transitory computer-readable storage media of claim 12, wherein the plurality of instructions further cause the storage manager device to:

determine an index of a partition in which to store the replicas based on an identifier in the data write request; and select the first storage node and the second storage node from the plurality of storage nodes based on the partition index.

15. The one or more non-transitory computer-readable storage media of claim 12, wherein the plurality of instructions further cause the storage manager device to:

generate a hash based on an identifier included in the data write request;

perform a modulus operation on the hash to determine a partition index in which to store the replicas; and select the first storage node and the second storage node from the plurality of storage nodes based on the partition index.

16. The one or more non-transitory computer-readable storage media of claim 12, wherein the plurality of instructions further cause the storage manager device to:

generate a hash based on a uniform resource locator (URL) included in the data write request; and select the first storage node and the second storage node from the plurality of storage nodes based on the hash.

17. The one or more non-transitory computer-readable storage media of claim 12, wherein the plurality of instructions further cause the storage manager device to:

determine an index of a partition in which to store the replicas;

determine a first storage drive in which to store the primary replica, based on the index of the partition;

determine a second storage drive in which to store the non-primary replica, based on the index of the partition;

determine the first storage node based on the determined first storage drive; and determine the second storage node based on the determined second storage drive.

18. The one or more non-transitory computer-readable storage media of claim 17, wherein:

to determine the first storage drive in which to store the primary replica comprises to determine a solid state drive; and to determine the second storage drive in which to store the non-primary replica comprises to determine a hard disk drive.

19. The one or more non-transitory computer-readable storage media of claim 12, wherein to transmit the replication requests comprises to transmit the replication requests as hypertext transfer protocol (HTTP) requests.

20. The one or more non-transitory computer-readable storage media of claim 12, wherein the plurality of instructions further cause the storage manager device to:
receive a data read request to retrieve the data;
identify the storage node in which the primary replica of the data is stored based on an identifier included in the data read request; and
transmit a data retrieval request to the identified storage node to retrieve the primary replica of the data from a cache of the identified data storage node.

21. The one or more non-transitory computer-readable storage media of claim 12, wherein the plurality of instructions further cause the storage manager device to:
receive a data read request to retrieve the data;
identify an index of a partition in which replicas of the data are stored;
identify storage nodes associated with the replicas based on the partition index;
determine whether to request a cached replica of the data or a non-cached replica of the data; and
transmit a data retrieval request to the first storage node to retrieve the cached replica of the data in response to a determination to retrieve the cached replica.

22. The one or more non-transitory computer-readable storage media of claim 21, wherein to identify an index of a partition in which replicas of the data are stored comprises to:
generate a hash of a uniform resource locator (URL) included in the data read request; and
perform a modulus function on the hash.

23. A storage manager device for managing replica caching in a distributed storage system that includes a plurality of storage nodes, the storage manager device comprising:
network communication circuitry for receiving a data write request from a client device to store replicas of data;
means for designating one of the replicas as a primary replica;
means for selecting (i) a first storage node of the plurality of storage nodes to store the primary replica of the data in a cache storage of the first storage node and (ii) at least a second storage node to store a non-primary replica of the data in a non-cache storage of the second storage node; and
means for including a hint in a first replication request of a plurality of replication requests to be transmitted, wherein the first replication request is to the first storage node and the hint is to indicate that the first storage node is to store the data in the cache storage of the first storage node as the primary replica;
wherein the network communication circuitry is further for transmitting the replication requests to the respective storage nodes to store replicas of the data.

24. The storage manager device of claim 23, wherein the network communication circuitry for transmitting the replication requests to the respective storage nodes further comprises:
circuitry for transmitting the first replication request to the first storage node to cause the first storage node to store the data in the cache storage of the first storage node; and
circuitry for transmitting a second replication request to the second storage node to cause the second storage node to store the data in the non-cache storage of the second storage node, wherein the second replication request does not include the hint.

25. The storage manager device of claim 23, further comprising:
means for determining an index of a partition in which to store the replicas based on an identifier in the data write request; and
means for selecting the first storage node and the second storage node from the plurality of storage nodes based on the partition index.

26. A method for managing replica caching in a distributed storage system that includes a plurality of storage nodes, the method comprising:
receiving, by a storage manager device, a data write request from a client device to store replicas of data;
designating, by the storage manager device, one of the replicas as a primary replica;
selecting, by the storage manager device, (i) a first storage node of the plurality of storage nodes to store the primary replica of the data in a cache storage of the first storage node and (ii) at least a second storage node to store a non-primary replica of the data in a non-cache storage of the second storage node;
including, by the storage manager device, a hint in a first replication request of a plurality of replication requests to be transmitted, wherein the first replication request is to the first storage node and the hint is to indicate that the first storage node is to store the data in the cache storage of the first storage node as the primary replica; and
transmitting, by the storage manager device, the replication requests to the respective storage nodes to store replicas of the data.

27. The method of claim 26, wherein transmitting the replication requests to the respective storage nodes comprises:
transmitting, by the storage manager device, the first replication request to the first storage node to cause the first storage node to store the data in the cache storage of the first storage node; and
transmitting, by the storage manager device, a second replication request to the second storage node to cause the second storage node to store the data in the non-cache storage of the second storage node, wherein the second replication request does not include the hint.

28. The method of claim 26, further comprising:
determining, by the storage manager device, an index of a partition in which to store the replicas based on an identifier in the data write request; and
selecting, by the storage manager device, the first storage node and the second storage node from the plurality of storage nodes based on the partition index.

29. The method of claim 26, further comprising:
generating, by the storage manager device, a hash based on an identifier included in the data write request;
performing, by the storage manager device, a modulus operation on the hash to determine a partition index in which to store the replicas; and
selecting, by the storage manager device, the first storage node and the second storage node from the plurality of storage nodes based on the partition index.

30. The method of claim 26, further comprising:
generating, by the storage manager device, a hash based on a uniform resource locator (URL) included in the data write request; and selecting, by the storage manager device, the first storage node and the second storage node from the plurality of storage nodes based on the hash.

* * * * *